US011037512B2

(12) United States Patent
Cho et al.

(10) Patent No.: US 11,037,512 B2
(45) Date of Patent: Jun. 15, 2021

(54) FLEXIBLE DISPLAY DEVICE

(71) Applicant: Samsung Display Co., Ltd., Yongin-si (KR)

(72) Inventors: Seongheon Cho, Hwaseong-si (KR); Bonghyun You, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/719,685

(22) Filed: Dec. 18, 2019

(65) Prior Publication Data

US 2020/0202797 A1 Jun. 25, 2020

(30) Foreign Application Priority Data

Dec. 19, 2018 (KR) ........................ 10-2018-0165423

(51) Int. Cl.

| | |
|---|---|
| ***G09G 3/3291*** | (2016.01) |
| ***G06F 9/30*** | (2018.01) |
| ***G09G 3/3266*** | (2016.01) |
| ***G09F 9/30*** | (2006.01) |

(52) U.S. Cl.

CPC ........... *G09G 3/3291* (2013.01); *G09F 9/301* (2013.01); *G09G 3/3266* (2013.01); *G09G 2310/027* (2013.01)

(58) Field of Classification Search

CPC ........................................................ G09F 9/301

See application file for complete search history.

(56) References Cited

U.S. PATENT DOCUMENTS

| | | | |
|---|---|---|---|
| 9,489,078 B2 | 11/2016 | Seo et al. | |
| 10,127,863 B2 | 11/2018 | Jeon et al. | |
| 10,163,397 B2 | 12/2018 | Son et al. | |
| 10,209,878 B2 | 2/2019 | Sang et al. | |
| 2013/0321340 A1* | 12/2013 | Seo ..................... | H04M 1/0214 345/174 |
| 2017/0345371 A1* | 11/2017 | Son ....................... | G09G 3/3266 |
| 2018/0130422 A1* | 5/2018 | Jeon ...................... | G09G 3/3275 |
| 2018/0145269 A1 | 5/2018 | Myeong et al. | |

FOREIGN PATENT DOCUMENTS

| | | |
|---|---|---|
| KR | 10-2012-0092037 A | 8/2012 |
| KR | 10-2015-0141261 A | 12/2015 |
| KR | 10-2016-0108705 A | 9/2016 |
| KR | 10-2017-0136091 A | 12/2017 |

* cited by examiner

*Primary Examiner* — Gustavo Polo

(74) *Attorney, Agent, or Firm* — Lewis Roca Rothgerber Christie LLP

(57) ABSTRACT

A display device includes a display panel including a first display region having first pixels connected to first data lines and scan lines and a second display region having second pixels connected to second data lines and the scan lines, a voltage generator configured to generate a first driving voltage, a driving controller configured to output a first switching signal and a second switching signal, and a switching circuit configured to provide the first driving voltage to the first pixels in response to the first switching signal and provide the first driving voltage to the second pixels in response to the second switching signal, wherein the driving controller determines whether each of the first display region and the second display region is a visible region or a non-visible region, and outputs the first switching signal and the second switching signal corresponding to a determination result.

19 Claims, 16 Drawing Sheets

FLEXIBLE DISPLAY DEVICE

CROSS-REFERENCE TO RELATED APPLICATION

This application claims priority to and the benefit of Korean Patent Application No. 10-2018-0165423, filed on Dec. 19, 2018, the entire contents of which are hereby incorporated by reference.

BACKGROUND

Aspects of some example embodiments of the present disclosure herein relate to a display device, and for example, to a flexible display device that is bendable or foldable.

Various display devices for use in multimedia devices such as televisions, mobile phones, tablet computers, navigators, game machines, and the like are being developed. For example, flexible display devices that are variously deformable to be bent or folded have recently been developed.

Meanwhile, various research is being carried out to reduce power consumption of battery-powered electronic devices such as mobile phones, tablet computers, navigators, game machines, and the like.

The above information disclosed in this Background section is only for enhancement of understanding of the background and therefore it may contain information that does not constitute prior art.

SUMMARY

Aspects of some example embodiments of the present disclosure include a flexible display device for reducing power consumption.

According to some example embodiments of the inventive concept, a display device includes: a display panel including a first display region having first pixels connected to a plurality of first data lines and a plurality of scan lines and a second display region having second pixels connected to a plurality of second data lines and the plurality of scan lines; a voltage generator configured to generate a first driving voltage; a driving controller configured to output a first switching signal and a second switching signal; and a switching circuit configured to provide the first driving voltage to the first pixels in response to the first switching signal and provide the first driving voltage to the second pixels in response to the second switching signal. The driving controller determines whether each of the first display region and the second display region is a visible region or a non-visible region, and outputs the first switching signal and the second switching signal corresponding to a determination result.

According to some example embodiments, the driving controller may generate the first switching signal and the second switching signal so as to provide the first driving voltage to the first pixels and not to provide the first driving voltage to the second pixels when the first display region is the visible region and the second display region is the non-visible region.

According to some example embodiments, the display device may further include: a light emitter configured to output a light ray signal; and a light receiver configured to activate a light detection signal when the light ray signal is received. The driving controller may deactivate either the first switching signal or the second switching signal when the light detection signal is activated.

According to some example embodiments, the switching circuit may include: a first switching transistor configured to transfer the first driving voltage to a first voltage line in response to the first switching signal; and a second switching transistor configured to transfer the first driving voltage to a second voltage line in response to the second switching signal.

According to some example embodiments, at least one of the first pixels may include: a light emitting diode including an anode and a cathode; a first transistor including a first electrode connected to the first voltage line, a second electrode electrically connected to the anode of the light emitting diode, and a gate electrode; a second transistor including a first electrode connected to a corresponding first data line among the plurality of first data lines, and a gate electrode connected to the first electrode of the first transistor and receiving a first scan signal; and a third transistor including a first electrode connected to the second electrode of the first transistor, a second electrode connected to the gate electrode of the second transistor, and a gate electrode connected to a second scan signal.

According to some example embodiments, at least one of the second pixels may include: a light emitting diode including an anode and a cathode; a first transistor including a first electrode connected to second first voltage line, a second electrode electrically connected to the anode of the light emitting diode, and a gate electrode; a second transistor including a first electrode connected to a corresponding second data line among the plurality of second data lines, and a gate electrode connected to the first electrode of the first transistor and receiving a first scan signal; and a third transistor including a first electrode connected to the second electrode of the first transistor, a second electrode connected to the gate electrode of the second transistor, and a gate electrode connected to a second scan signal.

According to some example embodiments, the display device may further include: a first data driving circuit configured to drive the first data lines; a second data driving circuit configured to drive the second data lines; and a scan driving circuit configured to drive the plurality of scan lines.

According to some example embodiments, the driving controller may further output a third switching signal and a fourth switching signal, and the display device may further include a data driving control circuit configured to selectively provide a second driving voltage to the first data driving circuit in response to the third switching signal and selectively provide the second driving voltage to the second data driving circuit in response to the fourth switching signal.

According to some example embodiments, the data driving control circuit may be located on the same circuit board as at least one of the driving controller and the voltage generator.

According to some example embodiments, the data driving control circuit may be on the same circuit board as at least one of the first data driving circuit and the second data driving circuit.

According to some example embodiments, the data driving control circuit may include: a third switching transistor configured to transfer the second driving voltage to the first data driving circuit in response to the third switching signal; and a fourth switching transistor configured to transfer the second driving voltage to the second data driving circuit in response to the fourth switching signal.

According to some example embodiments, the display panel may include a bending region and a non-bending region, and may include: a base layer; a pixel layer on the base layer; and a conductive layer in the bending region between the base layer and the pixel layer, wherein the display device may further include a resistance measurement circuit configured to measure a resistance of the conductive layer.

According to some example embodiments, the display panel may be bent about a bending axis, and the driving controller may output the first switching signal or the second switching signal at an inactive level when the measured resistance indicates that the display panel is bent.

According to some example embodiments of the inventive concept, a display device includes: a display panel including a first display region having first pixels connected to a plurality of first data lines and a plurality of first scan lines and a second display region having second pixels connected to a plurality of second data lines and a plurality of second scan lines; a driving controller configured to output a first start control signal and a second start control signal; a first scan driving circuit configured to drive the plurality of first scan lines in response to the first start control signal; and a second scan driving circuit configured to drive the plurality of second scan lines in response to the second start control signal. The driving controller may determine whether or not each of the first display region and the second display region is a visible region or a non-visible region, and outputs the first start control signal and the second start control signal corresponding to a determination result.

According to some example embodiments, the driving controller may provide the first start control signal to the first scan driving circuit and maintain the second start control signal at an inactive level when the first display region is the visible region and the second display region is the non-visible region.

According to some example embodiments, the display device may further include: a light emitter configured to output a light ray signal; and a light receiver configured to activate a light detection signal when the light ray signal is received, wherein the driving controller may maintain the first start control signal or the second start control signal at an inactive level when the light detection signal is activated.

According to some example embodiments, the display device may further include: a first light emission driving circuit configured to provide a first light emission control signal to the first pixels in synchronization with a first light emission start signal; and a second light emission driving circuit configured to provide a second light emission control signal to the second pixels in synchronization with a second light emission start signal, wherein the driving controller may further output the first light emission start signal and the second light emission start signal.

According to some example embodiments, the driving controller may provide the first light emission start signal to the first light emission driving circuit and maintain the second light emission start signal at an inactive level when the first display region is the visible region and the second display region is the non-visible region.

According to some example embodiments, the display panel may include a bending region and a non-bending region, and may include: a base layer; a pixel circuit layer on the base layer; and a conductive layer in the bending region between the base layer and the pixel circuit layer, wherein the display device may further include a resistance measurement circuit configured to measure a resistance of the conductive layer.

According to some example embodiments, the display panel may be bent about a bending axis, and the driving controller may output the corresponding first start control signal or second start control signal at an inactive level when the measured resistance indicates that the display panel is bent.

BRIEF DESCRIPTION OF THE FIGURES

The accompanying drawings are included to provide a further understanding of the inventive concept, and are incorporated in and constitute a part of this specification. The drawings illustrate aspects of some example embodiments of the inventive concept and, together with the description, serve to explain aspects of the inventive concept. In the drawings.

DETAILED DESCRIPTION

Figure 1:
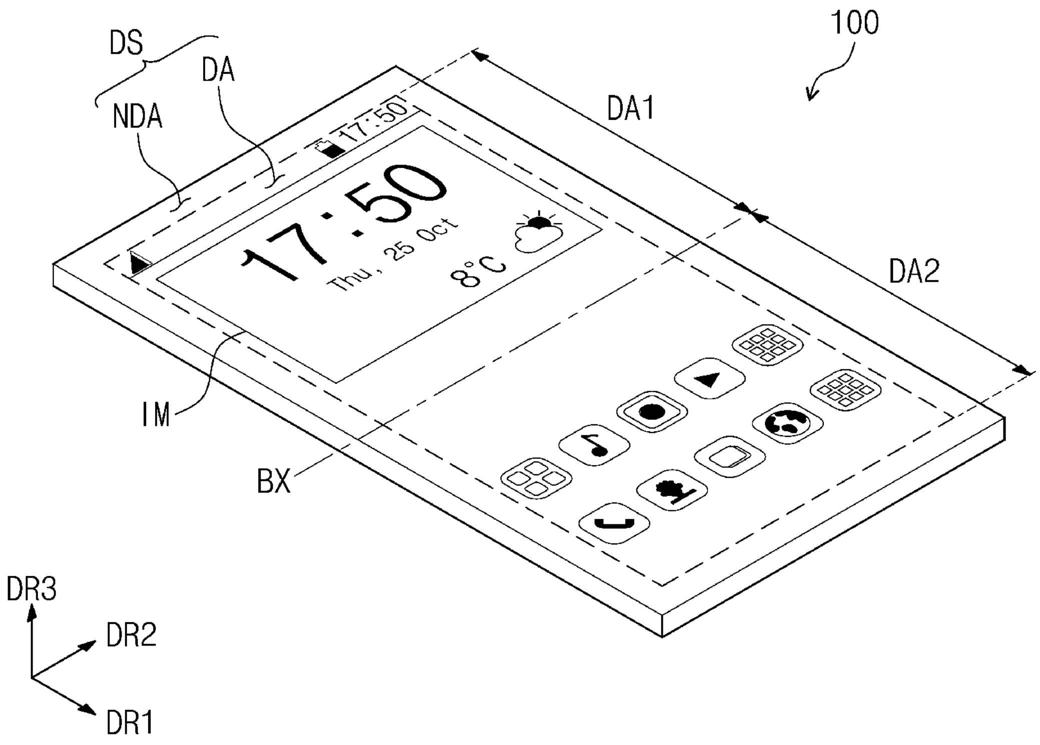
FIG. 1 is a perspective view illustrating a display device according to some example embodiments of the inventive concept.

It will be understood that when an element (or a region, layer, portion, or the like) is referred to as being "on", "connected to", or "coupled to" another element, it can be directly on or directly connected/coupled to the other element, or a third element may be present therebetween.

The same reference numerals refer to the same elements. In the drawings, the thicknesses, ratios, and dimensions of elements are exaggerated for clarity of illustration.

As used herein, the term "and/or" includes any combinations that can be defined by associated elements.

The terms "first", "second" and the like may be used for describing various elements, but the elements should not be construed as being limited by the terms. Such terms are only used for distinguishing one element from other elements. For example, a first element could be termed a second element and vice versa without departing from the teachings of the present disclosure. The terms of a singular form may include plural forms unless otherwise specified.

Furthermore, the terms "under", "lower side", "on", "upper side", and the like are used to describe association relationships among elements illustrated in the drawings. The terms, which are relative concepts, are used on the basis of directions illustrated in the drawings.

All of the terms used herein (including technical and scientific terms) have the same meanings as understood by those skilled in the art, unless otherwise defined. Terms in common usage such as those defined in commonly used dictionaries should be interpreted to contextually match the meanings in the relevant art, and are explicitly defined herein unless interpreted in an idealized or overly formal sense.

It will be further understood that the terms "include", "including", "has", "having", and the like, when used in this specification, specify the presence of stated features, numbers, steps, operations, elements, components, or combinations thereof, but do not preclude the presence or addition of one or more other features, numbers, steps, operations, elements, components, or combinations thereof.

Hereinafter, embodiments of the inventive concept will be described in more detail with reference to the accompanying drawings.

FIG. 1 is a perspective view illustrating a display device according to some example embodiments of the inventive concept.

Referring to FIG. 1, a display device 100 according to some example embodiments of the inventive concept includes a display surface DS on which an image IM is displayed, wherein the display surface DS is parallel to a plane defined by a first direction DR1 and a second direction DR2. A normal direction of the display surface DS, i.e., a thickness direction of the display device 100, is indicated by a third direction DR3. An upper surface (or front surface) and lower surface (or rear surface) of each member is differentiated by the third direction DR3. However, the directions indicated by the first to third directions DR1 to DR3 are relative concepts and thus may be changed to other directions. Hereinafter, first to third directions which are indicated by the first to third directions DR1 to DR3 referred to by the same reference symbols. The display device 100 according to some example embodiments of the inventive concept may be a flexible display device. The display device 100 according to some example embodiments of the inventive concept may be a foldable display device or a rollable display device, but embodiments are not particularly limited. The display device 100 according to some example embodiments of the inventive concept may be used in a large-size electronic device such as a television, a monitor, or the like, or a small- or medium-size electronic device such as a mobile phone, a tablet, a vehicle navigator, a game machine, a smart watch, or the like.

In the present disclosure, the term "flexible" represents a bendable characteristic without causing damage, and may encompass a structure that is bent to a level of several nanometers without being limited to a structure that is bent and completely folded.

As illustrated in FIG. 1, the display surface DS of the display device 100 may include a plurality of regions. The display device 100 includes a display region DA at which the image IM is displayed and a non-display region NDA adjacent to the display region DA. The non-display region NDA is one at which the image IM is not displayed. FIG. 1 illustrates icons and a clock window as an example of the image IM. The display region DA may be rectangular. The non-display region NDA may surround the display region DA. However, embodiments of the inventive concept are not limited thereto, and thus a shape of the display region DA and a shape of the non-display region NDA may be relatively designed.

For example, the display device 100 may be an organic light emitting display device. For example, embodiments of the inventive concept are not limited thereto, and thus the display device 100 may be a liquid crystal display device, a plasma display device, an electrophoretic display device, a microelectromechanical system (MEMS) display device, an electrowetting display device, or the like.

According to some example embodiments, the display region DA may be divided into a first display region DA1 and a second display region DA2 with respect to a bending axis BX. The first display region DA1 and the second display region DA2 may have the same area in this embodiment, but may have different areas in other embodiments. Furthermore, the display region DA is divided into two regions in this embodiment, but may be divided into more than two regions.

Figure 2A:
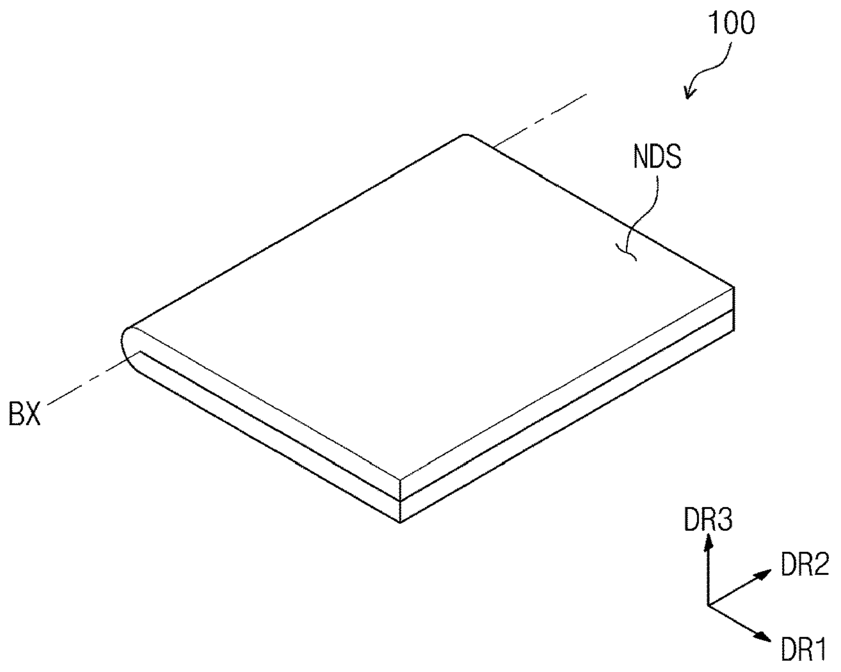
FIGS. 2A and 2B illustrate the display device of FIG. 1 as being folded.
Figure 2B:
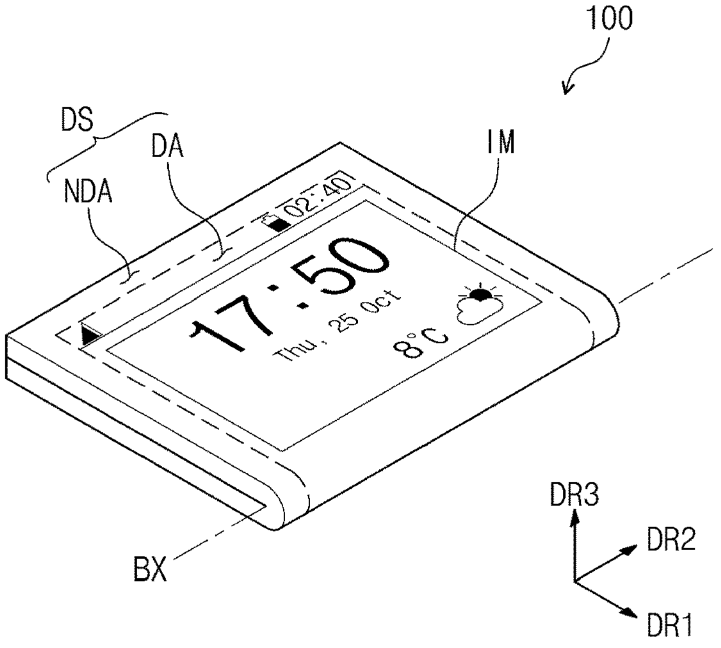

FIGS. 2A and 2B illustrate the display device of FIG. 1 as being folded.

Referring to FIGS. 1, 2A, and 2B, the display device 100 according to some example embodiments of the inventive concept may operate in a first mode in which at least a part of the display device 100 is bent or a second mode in which the display device 100 is unbent. FIGS. 2A and 2B illustrate an example in which the display device 100 is operating in the first mode, and FIG. 1 illustrates an example in which the display device 100 is operating in the second mode.

Referring to FIG. 2A, the display device 100 according to some example embodiments of the inventive concept may be in-folded with respect to the bending axis BX in the first mode. When the display device 100 is completely in-folded, the display surface DS is not exposed to the outside, but a lower surface NDS is exposed to the outside. Furthermore, referring to FIG. 2B, the display device 100 according to some example embodiments of the inventive concept may be out-folded with respect to the bending axis BX in the first mode.

Figure 3A:
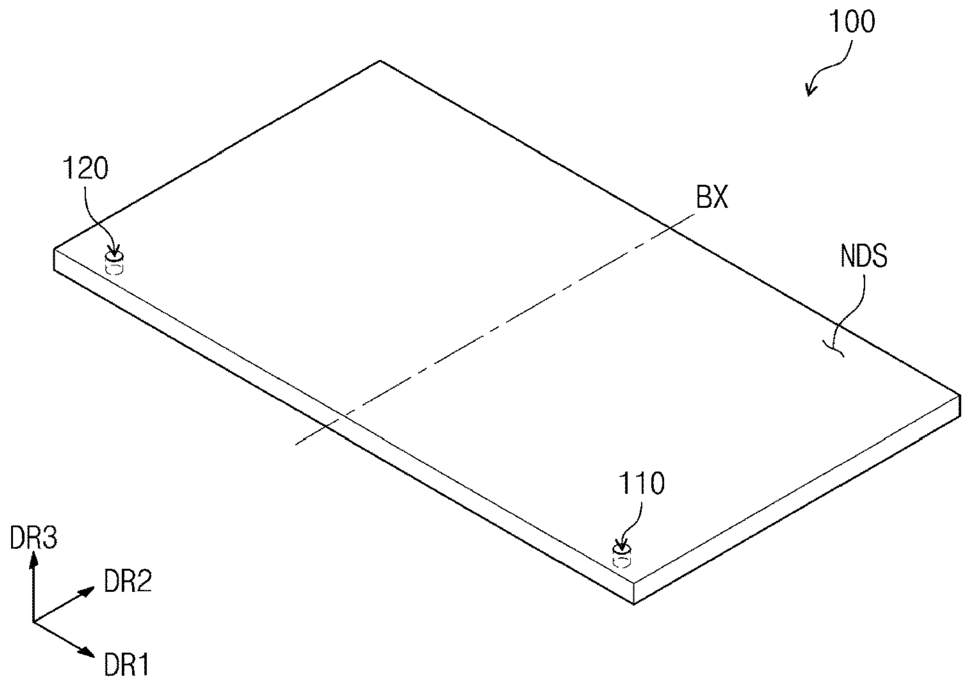
FIG. 3A is a perspective view illustrating a lower surface of a display device according to some example embodiments of the inventive concept.
Figure 3B:
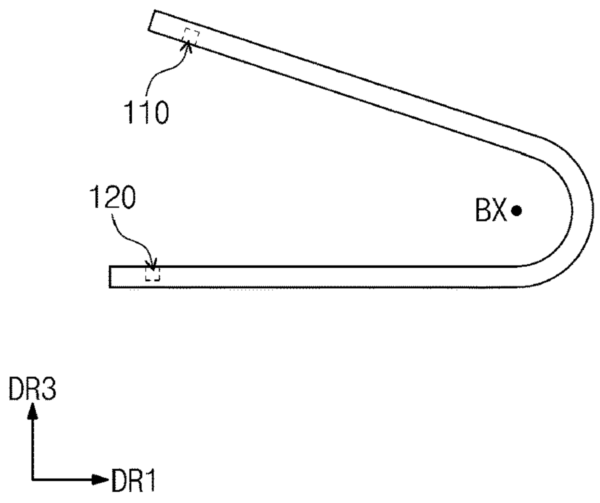
FIG. 3B is a diagram illustrating a display device as being out-folded according to some example embodiments of the inventive concept.

FIG. 3A is a perspective view illustrating the lower surface of the display device. FIG. 3B is a diagram illustrating the display device as being out-folded.

Referring to FIGS. 3A and 3B, a light emitter 110 and a light receiver 120 are arranged in the lower surface NDS of the display device 100. The light emitter 110 and the light receiver 120 are spaced a distance (e.g., a predetermined distance) apart in the first direction with respect to the bending axis BX.

The light emitter 110 outputs a light ray signal. The light ray signal may be an infrared signal, but is not limited thereto. The light receiver 120 receives the light ray signal from the light emitter 110. In the case where the light emitter 110 outputs an infrared signal, the light receiver 120 may be an infrared sensor. However, embodiments of the inventive concept are not limited thereto.

The light ray signal output from the light emitter 110 when the display device 100 is out-folded may be received by the light receiver 120. The light receiver 120 may detect that the display device 100 is out-folded when a light quantity of the received light ray signal has at least a predetermined level.

Figure 4:
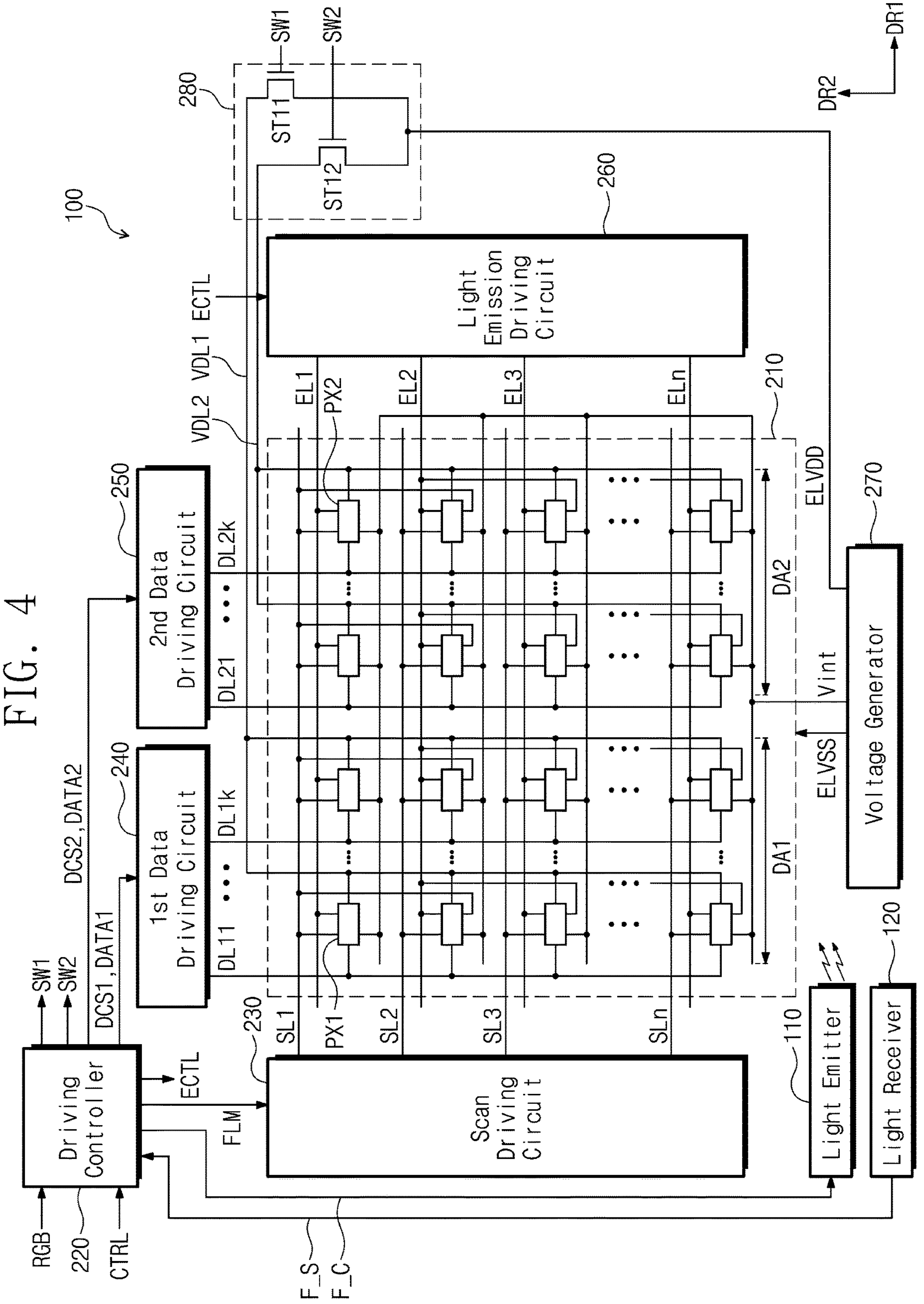
FIG. 4 is a diagram illustrating a circuit configuration of a display device according to some example embodiments of the inventive concept.

FIG. 4 is a diagram illustrating a circuit configuration of a display device according to some example embodiments of the inventive concept.

Referring to FIG. 4, the display device 100 includes a pixel circuit 210, a driving controller 220, a scan driving circuit 230, a first data driving circuit 240, a second data driving circuit 250, a light emission driving circuit 260, a voltage generator 270, and a switching circuit 280.

The driving controller 220 receives an image signal RGB and a control signal CTRL, and converts a data format of the image signal RGB so that the image signal RGB is suitable for the pixel circuit 210, so as to generate a first image data signal DATA1 and a second image data signal DATA2. The driving controller 220 outputs a start control signal FLM, a light emission start signal ECTL, a first data control signal DCS1, a second data control signal DCS2, a folding detection control signal F_C, a first switching signal SW1, and a second switching signal SW2. Although FIG. 4 illustrates that the driving controller 220 only provides the start control signal FLM to the scan driving circuit 230, the driving controller 220 may further provide other signals to the scan driving circuit 230.

The scan driving circuit 230 receives the start control signal FLM from the driving controller 220. The scan driving circuit 230 generates a plurality of scan signals, and outputs the plurality of scan signals to scan lines SL1 to SLn.

Although FIG. 4 illustrates the plurality of scan signals as being output from one scan driving circuit 230, embodiments of the inventive concept are not limited thereto. According to some example embodiments of the inventive concept, a plurality of scan driving circuits may divide and output the plurality of scan signals.

The light emission driving circuit 260 generates a plurality of light emission control signals in response to the light emission start signal ECTL, and outputs the light emission control signals to a plurality of light emission control lines EU to ELn.

Although FIG. 4 illustrates the plurality of light emission control signals as being output from one light emission driving circuit 260, embodiments of the inventive concept are not limited thereto. According to some example embodiments of the inventive concept, a plurality of light emission driving circuits may divide and output the plurality of light emission control signals.

According to some example embodiments of the inventive concept, the scan driving circuit 230 and the light emission driving circuit 260 are configured as independent circuits and arranged opposite to each other with the pixel circuit 210 therebetween. According to some example embodiments of the inventive concept, the scan driving circuit 230 and the light emission driving circuit 260 may be arranged adjacent to each other on one side of the pixel circuit 210. Furthermore, according to some example embodiments of the inventive concept, the scan driving circuit 230 and the light emission driving circuit 260 may be configured as a single circuit and arranged on one side of the pixel circuit 210.

The first data driving circuit 240 receives the first data control signal DCS1 and the first image data signal DATA1 from the driving controller 220. The first data driving circuit 240 converts the first image data signal DATA1 into first data signals, and outputs the first data signals to a plurality of first data lines DL11 to DL1*k*. The first data signals are analog voltages corresponding to gradation values of the first image data signal DATA1.

The second data driving circuit 250 receives the second data control signal DCS2 and the second image data signal DATA2 from the driving controller 220. The second data driving circuit 250 converts the second image data signal DATA2 into second data signals, and outputs the second data signals to a plurality of second data lines DL21 to DL2*k*. The second data signals are analog voltages corresponding to gradation values of the second image data signal DATA2.

The voltage generator 270 generates voltages required for operating the display device 100. According to some example embodiments of the inventive concept, the voltage generator 270 generates a first driving voltage ELVDD, a second driving voltage ELVSS, and an initialization voltage Vint, but embodiments of the inventive concept are not limited thereto. For example, the voltage generator 270 may further generate an analog reference voltage required for generating gradation voltages of the first data driving circuit 240 and the second data driving circuit 250. The second driving voltage ELVSS may have a lower level than that of the first driving voltage ELVDD.

The pixel circuit 210 includes a plurality of first pixels PX1 and a plurality of second pixels PX2. Each of the plurality of first pixels PX1 is connected to a corresponding first data line among the first data lines DL11 to DL1*k*, and is connected to a corresponding scan line among the scan lines SL1 to SLn. Each of the plurality of second pixels PX2 is connected to a corresponding second data line among the second data lines DL21 to DL2*k*, and is connected to a corresponding scan line among the scan lines SL1 to SLn.

Each of the plurality of first pixels PX1 and the plurality of second pixels PX2 receives the first driving voltage ELVDD, the second driving voltage ELVSS, and the initialization voltage Vint. Each of the first pixels PX1 is connected to a first voltage line VDL1 to which the first driving voltage ELVDD is applied. Each of the second pixels PX2 is connected to a second voltage line VDL2 to which the first driving voltage ELVDD is applied.

Each of the first pixels PX1 and the second pixels PX2 may be electrically connected to two scan lines. As illustrated in FIG. 4, pixels of a second pixel row may be connected to the scan lines SL1 and SL2.

The first pixels PX1 may be arranged in the first display region DA1 illustrated in FIG. 1, and the second pixels PX2 may be arranged in the second display region DA2.

Although, it is illustrated and described that the first pixels PX1 are connected to the first data driving circuit 240 via the first data lines DL11 to DL1*k*, and the second pixels PX2 are connected to the second data driving circuit 250 via the second data lines DL21 to DL2*k*, embodiments of the inventive concept are not limited thereto. For example, the first data lines DL11 to DL1*k* and the second data lines DL21 to DL2*k* may be driven by a single data driving circuit.

The scan lines SL1 to SLn, the light emission control lines EU to ELn, the first data lines DL11 to DL1*k*, the second data lines DL21 to DL2*k*, the first voltage line VDL1, the first pixels PX1, the second pixels PX2, and the scan driving circuit 230 may be formed on a base substrate through a photolithography process performed multiple times.

The switching circuit 280 provides the first driving voltage ELVDD to the first pixels PX1 via the first voltage line VDL1 in response to the first switching signal SW1, and provides the first driving voltage ELVDD to the second pixels PX2 via the second voltage line VDL2 in response to the second switching signals SW2.

The switching circuit 280 includes a first switching transistor ST11 and a second switching transistor ST12. The first switching transistor ST11 includes a first electrode for receiving the first driving voltage ELVDD, a second electrode connected to the first voltage line VDL1, and a gate electrode for receiving the first switching signal SW1. The second switching transistor ST12 includes a first electrode for receiving the first driving voltage ELVDD, a second electrode connected to the second voltage line VDL2, and a gate electrode for receiving the second switching signal SW2.

The driving controller 220 outputs the folding detection control signal F_C to the light emitter 110. For example, the driving controller 220 may periodically activate the folding detection control signal F_C during operation.

The light emitter 110 outputs the light ray signal in response to the folding detection control signal F_C. The light ray signal may be an infrared signal, but is not limited thereto. The light receiver 120 receives the light ray signal from the light emitter 110.

As illustrated in FIG. 3B, the light ray signal output from the light emitter 110 when the display device 100 is out-folded may be received by the light receiver 120. The light receiver 120 outputs a folding detection signal F_S at an active level (e.g., a high level) when the light quantity of the received light ray signal has at least a predetermined level. This folding detection signal F_S is provided to the driving controller 220.

The driving controller 220 regards the display device 100 as being out-folded when the folding detection signal F_S has an active level (e.g., a high level), and deactivates the first switching signal SW1 or the second switching signal SW2. For example, the driving controller 220 may deactivate the first switching signal SW1 when the folding detection signal F_S has an active level. When the first switching signal SW1 is deactivated, the first pixels PX1 may be turned off because the first driving voltage ELVDD is not provided to the first pixels PX1.

According to some example embodiments of the inventive concept, the display device 100 may further include a gyroscope sensor. The driving controller 220 may determine which one of the first display region DA1 and the second display region DA2 is an invisible (or non-visible, e.g., where images are not displayed) region on the basis of a detection signal from the gyroscope sensor when the folding detection signal F_S transitions to an active level. The driving controller 220 deactivates the first switching signal SW1 when the first display region DA1 is determined to be an invisible region, and deactivates the second switching signal SW2 when the second display region DA2 is determined to be an invisible region.

According to some example embodiments of the inventive concept, the driving controller 220 may regard a preset one among the first display region DA1 and the second display region DA2 as an invisible region when the folding detection signal F_S has an active level.

As described above, power consumption of the display device 100 may be reduced by turning off an invisible region when the display device 100 is out-folded.

Figure 5:
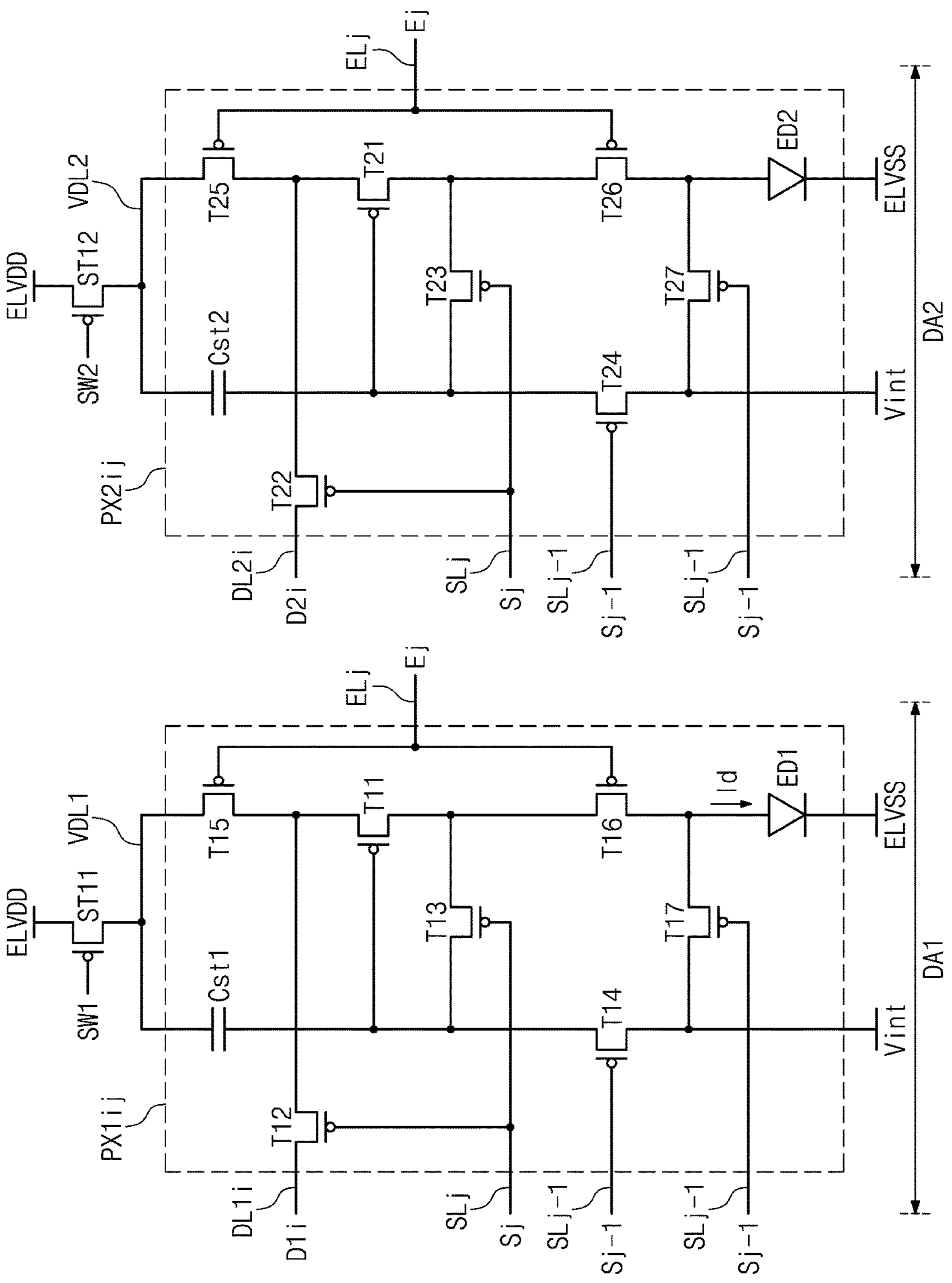
FIG. 5 is an equivalent circuit diagram of a first pixel and a second pixel according to some example embodiments of the inventive concept.

FIG. 5 is an equivalent circuit diagram of a first pixel and a second circuit according to some example embodiments of the inventive concept.

FIG. 5 illustrates an example of a first pixel PX1*ij* connected to an ith first data line DL1*i* among the plurality of first data lines DL11 to DL1*k*, a jth scan line SLj and (j−1)th scan line SLj−1 among the plurality of scan lines SL1 to SLn, and a jth light emission control line ELj among the plurality of light emission control lines EL1 to ELn, and a second pixel PX2*ij* connected to an ith second data line DL2*i* among the plurality of second data lines DL21 to DL2*k*, a jth scan line SLj and (j−1)th scan line SLj−1 among the plurality of scan lines SL1 to SLn, and a jth light emission control line ELj among the plurality of light emission control lines EL1 to ELn.

Each of the plurality of first pixels PX1 and the plurality of second pixels PX2 illustrated in FIG. 4 may have the same circuit configuration as the equivalent circuit diagram of the first pixel PX1*ij* and the second pixel PX2*ij* illustrated in FIG. 5.

According to some example embodiments of the inventive concept, the first pixel PX1*ij* includes first to seventh transistors T11 to T17, a capacitor Cst1, and at least one light emitting diode ED1. Each of the first to seventh transistors T11 to T17 is a P-type transistor having a low-temperatures polycrystalline silicon (LTPS) semiconductor layer. According to some example embodiments of the inventive concept, each of the first, second, fifth, sixth, and seventh transistors T11, T12, T15, T16, and T17 may be a P-type transistor having an LTPS semiconductor layer, and each of the third and fourth transistors T13 and T14 may be an N-type transistor having an oxide semiconductor layer. However, embodiments of the inventive concept are not limited thereto, and thus at least one of the first to seventh transistors T11 to T17 may be an N-type transistor and the others may be P-type transistors. Furthermore, the circuit configuration of the first pixel PX1*ij* according to some example embodiments of the inventive concept is not limited to that illustrated in FIG. 5. The first pixel PX1*ij* and the second pixel PX2*ij* illustrated in FIG. 5 is merely an example, and thus the circuit configuration may be modified.

For convenience, the jth scan line SLj and the (j−1)th scan line SLj−1 are referred to as a first scan line SLj and a second scan line SLj−1.

The first scan line SLj and the second scan line SLj−1 may transfer scan signals Sj and Sj−1 respectively.

The light emission control line ELj may transfer a light emission control signal Ej for controlling light emission of the light emitting diode ED1. The light emission control signal Ej transferred through the light emission control line ELj may have a waveform different from waveforms of the scan signals Sj and Sj−1 transferred through the first scan line SLj and the second scan line SLj−1. The first data line DL1*i* may transfer a first data signal D1*i*, and the first driving voltage line VDL1 may transfer the first driving voltage ELVDD. The first data signal D1*i* may have different voltage levels according to the first image data signal DATA1, and the first driving voltage ELVDD may have a substantially constant level.

The first transistor T11 includes a first electrode connected to the first driving voltage line VDL1 via the fifth transistor T15, a second electrode electrically connected to an anode of the light emitting diode ED1 via the sixth transistor T16, and a gate electrode connected to one end of the capacitor Cst1. The first transistor T11 may receive the first data signal D1*i* transferred through the first data line DL1*i* in response to a switching operation of the second transistor T12 to supply a driving current Id to the light emitting diode ED1. The first transistor T11 may be referred to as a driving transistor.

The second transistor T12 includes a first electrode connected to the first data line DL1*i*, a second electrode connected to the first electrode of the first transistor T11, and a gate electrode connected to the first scan line SLj. The second transistor T12 may be turned on in response to the scan signal Sj received through the first scan line SLj to transfer, to the first electrode of the first transistor T11, the first data signal D1*i* transferred from the first data line DL1*i*.

The third transistor T13 includes a first electrode connected to the gate electrode of the first transistor T11, a second electrode connected to the second electrode of the first transistor T11, and a gate electrode connected to the first scan line SLj. The third transistor T13 may be turned on in response to the scan signal Sj received through the first scan line SLj to connect the gate electrode and the second electrode of the first transistor T11 to each other so as to diode-connect the first transistor T11.

The fourth transistor T14 includes a first electrode connected to the gate electrode of the first transistor T11, a second electrode receiving the initialization voltage Vint, and a gate electrode connected to the second scan line SLj−1. The fourth transistor T14 is turned on in response to the scan signal Sj−1 received through the second scan line SLj−1, and transfers the initialization voltage Vint to the gate electrode of the first transistor T11 to perform an initialization operation for initializing a voltage of the gate electrode of the first transistor T11.

The fifth transistor T15 includes a first electrode connected to the first driving voltage line VDL1, a second electrode connected to the first electrode of the first transistor T11, and a gate electrode connected to the jth light emission control line ELj.

The sixth transistor T16 includes a second electrode connected to the first electrode of the first transistor T11, a second electrode connected to the anode of the light emitting diode ED1, and a gate electrode connected to the jth light emission control line ELj.

The fifth transistor T15 and the sixth transistor T16 may be simultaneously turned on in response to the light emission control signal Ej received through the jth light emission control line ELj so that the first driving voltage ELVDD is compensated through the diode-connected first transistor T11 and transferred to the light emitting diode ED1.

The seventh transistor T17 includes a first electrode connected to the second electrode of the fourth transistor T14, a second electrode connected to the second electrode of the sixth transistor T16, and a gate electrode connected to the second scan line SLj−1.

One end of the capacitor Cst1 is connected to the gate electrode of the first transistor T11 as described above, and the other end is connected to the first driving voltage line VDL1. A cathode of the light emitting diode ED1 may be connected to a terminal for transferring the second driving voltage ELVSS. A structure of the first pixel PX1*ij* according to some example embodiments of the inventive concept is not limited to the structure illustrated in FIG. 5, and thus the number of transistors and the number of capacitors included in the first pixel PX1*ij* and a connection relationship therebetween may be variously modified.

When the first switching signal SW1 has an active level (e.g., a low level), the first switching transistor ST11 may be turned on so that the first driving voltage line VDL1 may receive the first driving voltage ELVDD. Therefore, the first pixel PX1*ij* of the first display region DA1 operates in response to the first data signal D1*i*, the first scan signal Sj, the second scan signal Sj−1, and the light emission control signal Ej.

When the first switching signal SW1 has an inactive level (e.g., a high level), the first switching transistor ST11 may be turned off so that the first driving voltage line VDL1 is unable to receive the first driving voltage ELVDD. Therefore, the first pixel PX1*ij* of the first display region DA1 does not emit light.

According to some example embodiments of the inventive concept, the second pixel PX2*ij* includes first to seventh transistors T21 to T27, a capacitor Cst2, and at least one light emitting diode ED2. Each of the first to seventh transistors T21 to T27 is a P-type transistor having an LTPS semiconductor layer. According to some example embodiments of the inventive concept, each of the first, second, fifth, sixth, and seventh transistors T21, T22, T25, T26, and T27 may be a P-type transistor having an LTPS semiconductor layer, and each of the third and fourth transistors T23 and T24 may be an N-type transistor having an oxide semiconductor layer. However, embodiments of the inventive concept are not limited thereto, and thus at least one of the first to seventh transistors T21 to T27 may be an N-type transistor and the others may be P-type transistors. Furthermore, the circuit configuration of the second pixel PX2*ij* according to some example embodiments of the inventive concept is not limited to that illustrated in FIG. 5. The first pixel PX1*ij* and the second pixel PX2*ij* illustrated in FIG. 5 is merely an example, and thus the circuit configuration may be modified.

The connection relationship between the first to seventh transistors T21 to T27, the capacitor Cst2, and the light emitting diode ED2 of the second pixel PX2*ij* and operations thereof are similar to the connection relationship between the first to seventh transistors T11 to T17, the capacitor Cst1, and the light emitting diode ED1 of the first pixel PX1*ij* and operations thereof. Thus, overlapping descriptions are not provided below.

When the second switching signal SW2 has an active level (e.g., a low level), the second switching transistor ST12 may be turned on so that the second driving voltage line VDL2 may receive the first driving voltage ELVDD. Therefore, the second pixel PX2*ij* of the second display region DA2 operates in response to the second data signal D2*i*, the first scan signal Sj, the second scan signal Sj−1, and the light emission control signal Ej.

When the second switching signal SW2 has an inactive level (e.g., a high level), the second switching transistor ST12 may be turned off so that the second driving voltage line VDL2 is unable to receive the first driving voltage ELVDD. Therefore, the second pixel PX2*ij* of the second display region DA2 does not emit light.

The first display region DA1 or the second display region DA2 is turned off since the first switching signal SW1 or the second switching signal SW2 transitions to an inactive level (e.g., a high level) when the display device 100 is out-folded. Power consumption of the display device 100 may be reduced by turning off an invisible region when the display device 100 is out-folded.

Figure 6:
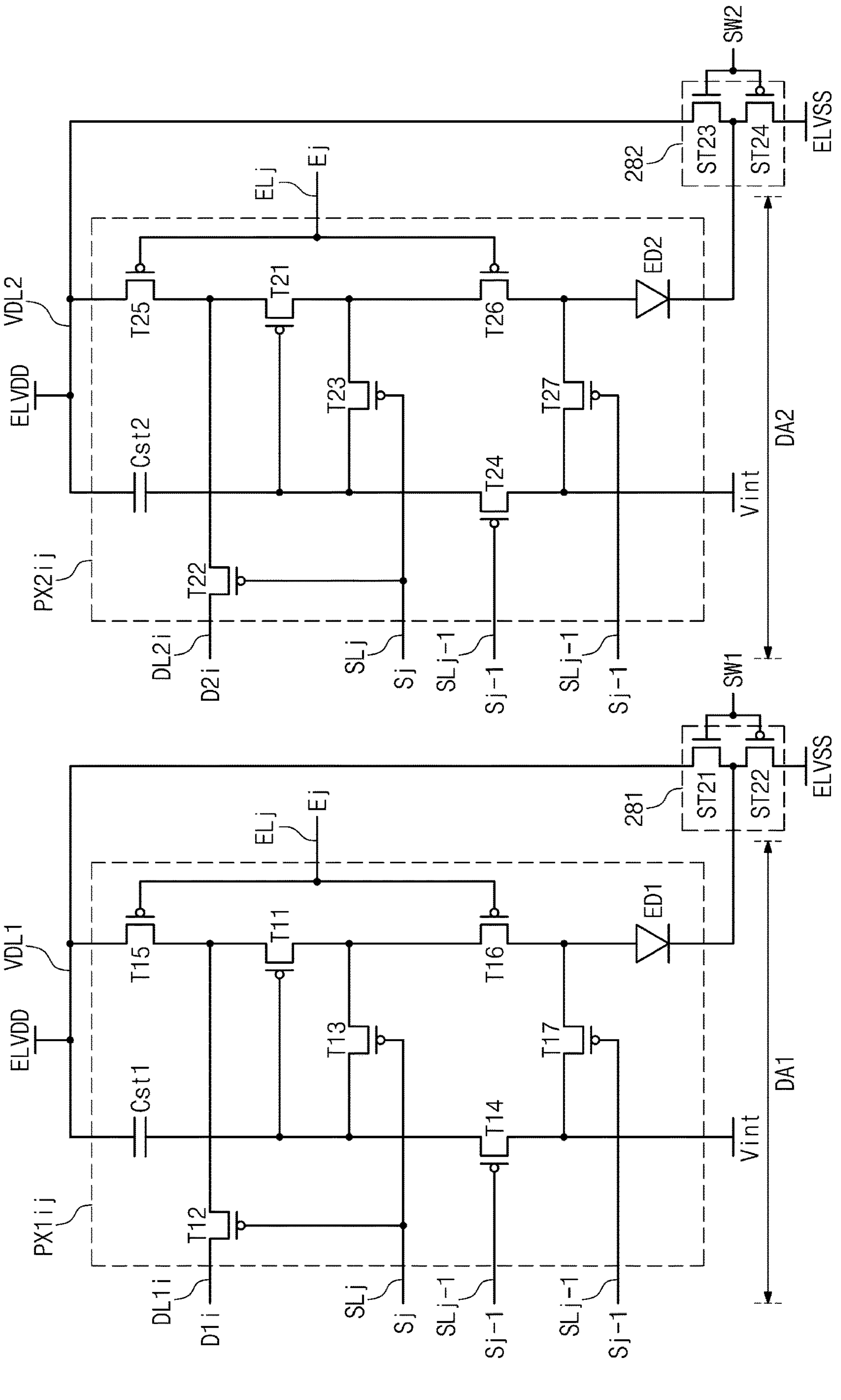
FIG. 6 illustrates first and second pixels and first and second switching circuits according to some example embodiments of the inventive concept.

FIG. 6 illustrates first and second pixels and first and second switching circuits according to some example embodiments of the inventive concept.

The first pixel PX1*ij* and the second pixel PX2*ij* illustrated in FIG. 6 may have the same circuit configuration as the first pixel PX1*ij* and the second pixel PX2*ij* illustrated in FIG. 5.

The display device 100 illustrated in FIG. 4 may include a first switching circuit 281 and a second switching circuit 282 instead of the switching circuit 280.

The first switching circuit 281 provides either the first driving voltage ELVDD or the second driving voltage ELVSS to the cathode of the light emitting diode ED1 in the first pixel PX1*ij* in response to the first switching signal SW1.

The first switching circuit 281 includes switching transistors ST21 and ST22. The switching transistor ST21 includes a first electrode connected to the first voltage line VDL1, a second electrode connected to the cathode of the light emitting diode ED1, and a control electrode for receiving the first switching signal SW1. The switching transistor ST22 includes a first electrode connected to the cathode of the light emitting diode ED1, a second electrode connected to a terminal for transferring the second driving voltage ELVSS, and a control electrode for receiving the first switching signal SW1. The switching transistor ST21 may be an N-type transistor, and the switching transistor ST22 may be a P-type transistor.

When the first switching signal SW1 has an active level (e.g., a low level), the switching transistor ST21 is turned off and the switching transistor ST22 is turned on so that the second driving voltage ELVSS is transferred to the cathode of the light emitting diode ED1. Therefore, the first pixel PX1*ij* of the first display region DA1 operates in response to the first data signal D1*i*, the first scan signal Sj, the second scan signal Sj−1, and the light emission control signal Ej.

When the first switching signal SW1 has an inactive level (e.g., a high level), the switching transistor ST21 is turned on and the switching transistor ST22 is turned off so that the first driving voltage ELVDD is transferred to the cathode of the light emitting diode ED1. Therefore, the first pixel PX1*ij* of the first display region DA1 does not emit light.

The second switching circuit 282 provides either the first driving voltage ELVDD or the second driving voltage ELVSS to the cathode of the light emitting diode ED2 in the second pixel PX2*ij* in response to the second switching signal SW2.

The second switching circuit 282 includes switching transistors ST23 and ST24. The switching transistor ST23 includes a first electrode connected to the second voltage line VDL2, a second electrode connected to the cathode of the light emitting diode ED2, and a control electrode for receiving the second switching signal SW2. The switching transistor ST24 includes a first electrode connected to the cathode of the light emitting diode ED2, a second electrode connected to a terminal for transferring the second driving voltage ELVSS, and a control electrode for receiving the second switching signal SW2. The switching transistor ST23 may be an N-type transistor, and the switching transistor ST24 may be a P-type transistor.

When the second switching signal SW2 has an active level (e.g., a low level), the switching transistor ST23 is turned off and the switching transistor ST24 is turned on so that the second driving voltage ELVSS is transferred to the cathode of the light emitting diode ED2. Therefore, the second pixel PX2*ij* of the second display region DA2 operates in response to the second data signal D2*i*, the first scan signal Sj, the second scan signal Sj−1, and the light emission control signal Ej.

When the second switching signal SW2 has an inactive level (e.g., a high level), the switching transistor ST23 is turned on and the switching transistor ST24 is turned off so that the first driving voltage ELVDD is transferred to the cathode of the light emitting diode ED2. Therefore, the second pixel PX2*ij* of the second display region DA2 does not emit light.

Figure 7:
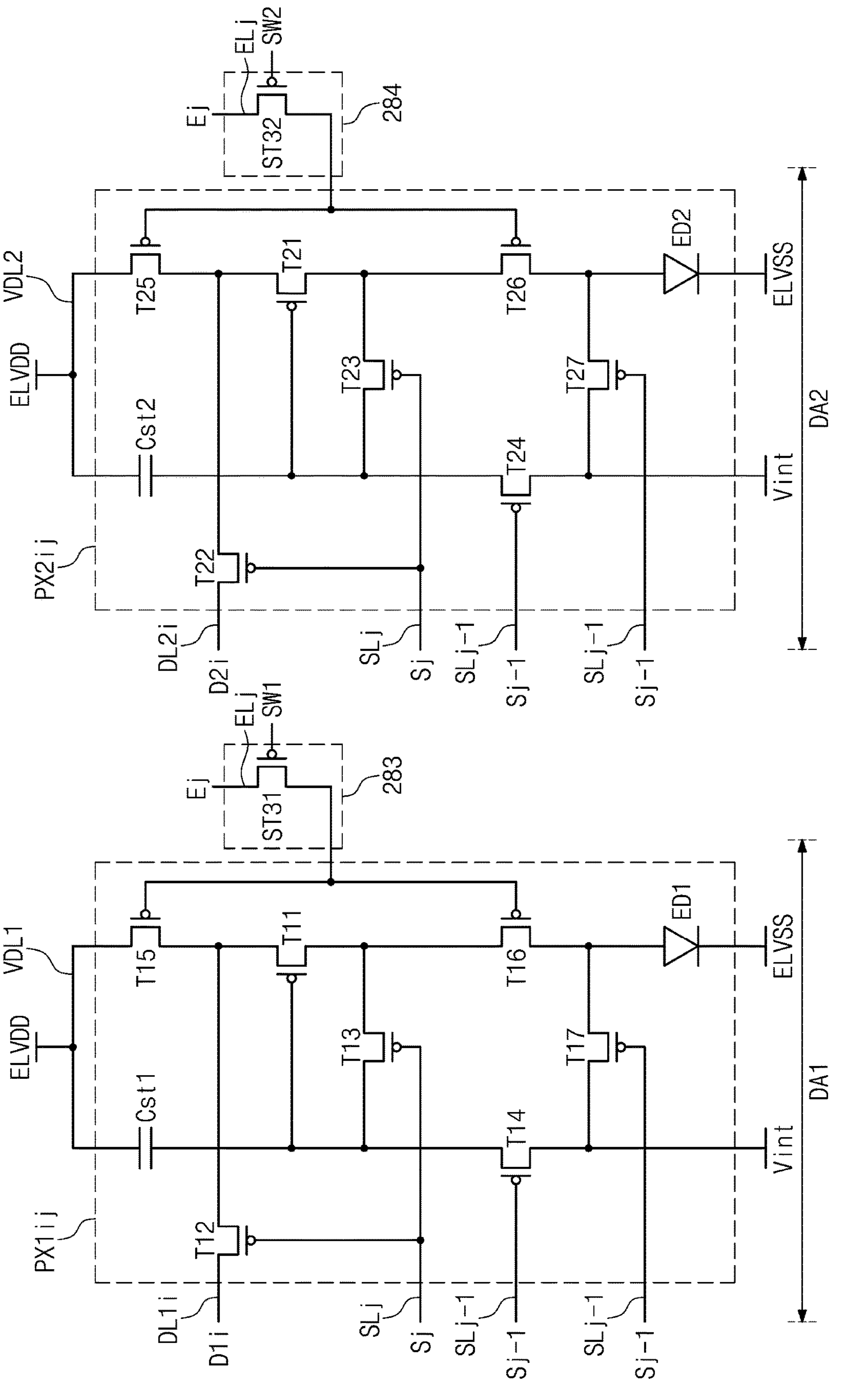
FIG. 7 illustrates first and second pixels and third and fourth switching circuits according to some example embodiments of the inventive concept.

FIG. 7 illustrates first and second pixels and third and fourth switching circuits according to some example embodiments of the inventive concept.

The first pixel PX1*ij* and the second pixel PX2*ij* illustrated in FIG. 7 may have the same circuit configuration as the first pixel PX1*ij* and the second pixel PX2*ij* illustrated in FIG. 5.

The display device 100 illustrated in FIG. 4 may include a third switching circuit 283 and a fourth switching circuit 284 instead of the switching circuit 280.

The third switching circuit 283 transfers the light emission control signal Ej to the first pixel PX1*ij* in response to the first switching signal SW1.

The third switching circuit 283 includes a switching transistor ST31. The switching transistor ST31 includes a first electrode for receiving the light emission control signal Ej, a second electrode connected to the gate electrode of each of the fifth and sixth transistors T15 and T16, and a control electrode for receiving the first switching signal SW1. The switching transistor ST31 may be a P-type transistor.

When the first switching signal SW1 has an active level (e.g., a low level), the switching transistor ST31 is turned on so that the light emission control signal Ej is transferred to the gate electrode of each of the fifth and sixth transistors T15 and T16. Therefore, the first pixel PX1*ij* of the first display region DA1 operates in response to the first data signal D1*i*, the first scan signal Sj, the second scan signal Sj−1, and the light emission control signal Ej.

When the first switching signal SW1 has an inactive level (e.g., a high level), the switching transistor ST31 is turned off so that the light emission control signal Ej is not transferred to the gate electrode of each of the fifth and sixth transistors T15 and T16. Therefore, the first pixel PX1*ij* of the first display region DA1 does not emit light.

The fourth switching circuit 284 transfers the light emission control signal Ej to the second pixel PX2*ij* in response to the second switching signal SW2.

The fourth switching circuit 284 includes a switching transistor ST32. The switching transistor ST32 includes a first electrode for receiving the light emission control signal Ej, a second electrode connected to the gate electrode of each of the fifth and sixth transistors T25 and T26, and a control electrode for receiving the second switching signal SW2. The switching transistor ST32 may be a P-type transistor.

When the second switching signal SW2 has an active level (e.g., a low level), the switching transistor ST32 is turned on so that the light emission control signal Ej is transferred to the gate electrode of each of the fifth and sixth transistors T25 and T26. Therefore, the second pixel PX2*ij* of the second display region DA2 operates in response to the second data signal D2*i*, the first scan signal Sj, the second scan signal Sj−1, and the light emission control signal Ej.

When the second switching signal SW2 has an inactive level (e.g., a high level), the switching transistor ST32 is turned off so that the light emission control signal Ej is not transferred to the gate electrode of each of the fifth and sixth transistors T25 and T26. Therefore, the second pixel PX2*ij* of the second display region DA2 does not emit light.

The display device 100 includes a single bending axis according to some example embodiments of the inventive concept, but the display device 100 may include a plurality of bending axes. For example, the display device 100 including two bending axes may include at least one invisible region. Power consumption of the display device 100 may be reduced by turning off at least one invisible region when the folding detection signal F_S transitions to an active level.

Figure 8:
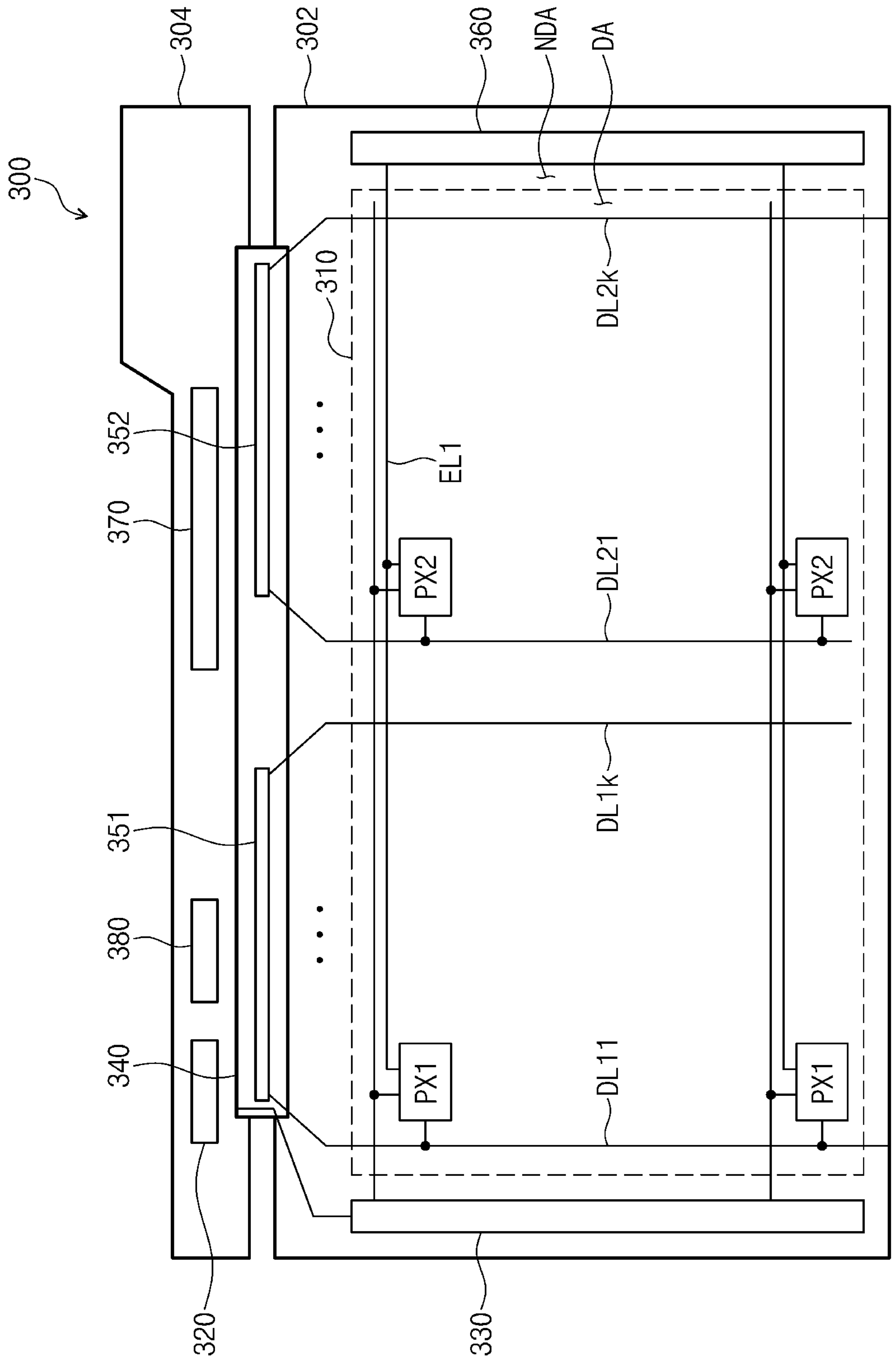
FIG. 8 is a planar view illustrating a display device according to some example embodiments of the inventive concept.

FIG. 8 is a planar view illustrating a display device according to some example embodiments of the inventive concept.

Referring to FIG. 8, a display device 300 includes a pixel circuit 310, a driving controller 320, a scan driving circuit 330, a first data driving circuit 351, a second data driving circuit 352, a light emission driving circuit 360, a voltage generator 370, and a switching circuit 380.

The pixel circuit 310, the scan driving circuit 330, and the light emission driving circuit 360 may be formed on a display substrate 302.

The driving controller 320, the voltage generator 370, and the switching circuit 380 may be mounted on a main substrate 304.

Each of the first data driving circuit 351 and the second data driving circuit 352 may be configured as an independent integrated circuit (IC). Each of the first data driving circuit 351 and the second data driving circuit 352 may be mounted on a flexible circuit board 340. The flexible circuit board 340 electrically connects the main substrate 304 and the display substrate 302.

FIG. 8 illustrates an example chip-on-film (COF)-type first data driving circuit 351 and second data driving circuit 352. According to some example embodiments of the inventive concept, the first data driving circuit 351 and the second data driving circuit 352 may be arranged on a non-display region NDA of the display substrate 302 using a chip-on-plastic (COP) method.

Figure 9:
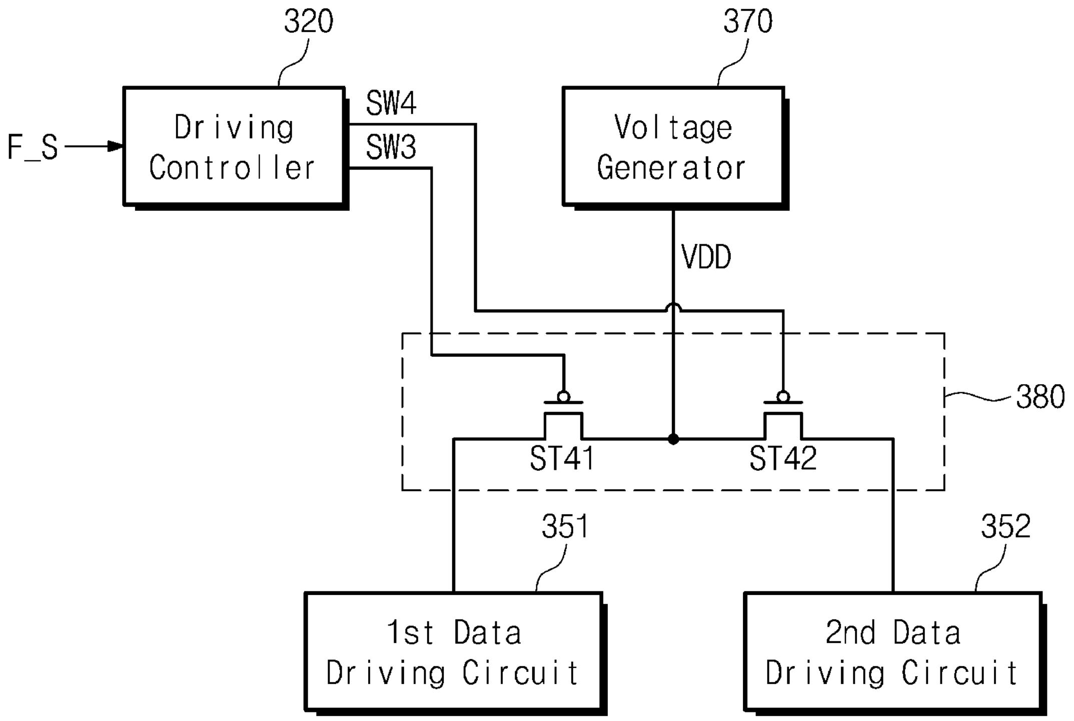
FIG. 9 is a diagram illustrating an example connection relationship between partial circuits illustrated in FIG. 8.

FIG. 9 is a diagram illustrating an example connection relationship between partial circuits illustrated in FIG. 8.

Referring to FIG. 9, the driving controller 320 receives the folding detection signal F_S, and outputs a third switching signal SW3 and a fourth switching signal SW4. For example, when the folding detection signal F_S has an active level (e.g., a high level), the driving controller 320 deactivates the third switching signal SW3 or the fourth switching signal SW4.

The voltage generator 370 generates a driving voltage VDD. The driving voltage VDD may be a power supply voltage of the first data driving circuit 351 and the second data driving circuit 352, but is not limited thereto. For example, the driving voltage VDD may be an analog reference voltage required for generating a gradation voltage of each of the first data driving circuit 351 and the second data driving circuit 352.

The switching circuit 380 may selectively provide the driving voltage VDD to the first data driving circuit 351 and the second data driving circuit 352 in response to the third switching signal SW3 and the fourth switching signal SW4.

The switching circuit 380 includes a switching transistor ST41 and a switching transistor ST42. The switching transistor ST41 includes a first electrode for receiving the driving voltage VDD, a second electrode connected to the first data driving circuit 351, and a gate electrode for receiving the third switching signal SW3. The switching transistor ST42 includes a first electrode for receiving the driving voltage VDD, a second electrode connected to the second data driving circuit 352, and a gate electrode for receiving the fourth switching signal SW4.

Figure 10:
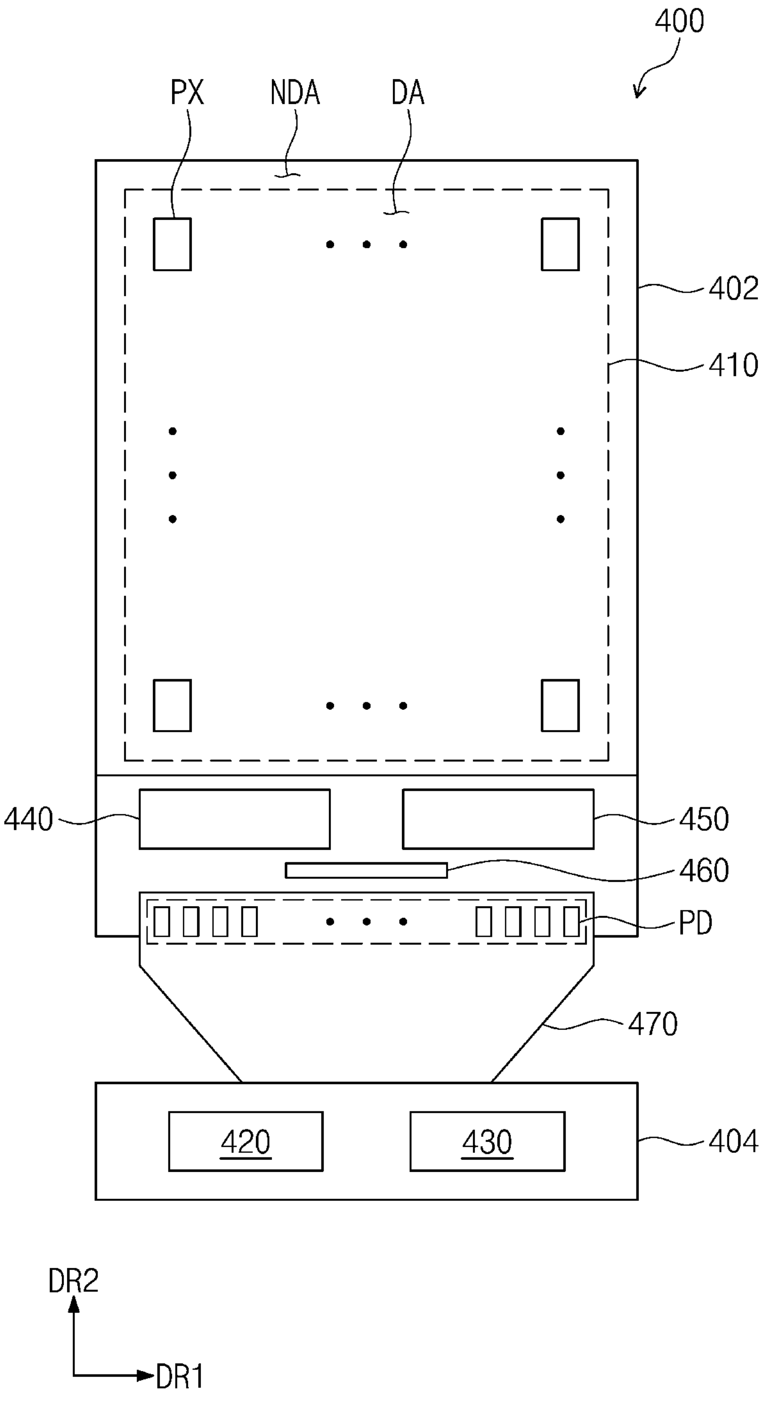
FIG. 10 is a planar view illustrating a display device according to some example embodiments of the inventive concept t.

FIG. 10 is a planar view illustrating a display device according to some example embodiments of the inventive concept.

Referring to FIG. 10, a display device 400 includes a pixel circuit 410, a driving controller 420, a voltage generator 430, a first data driving circuit 440, a second data driving circuit 450, and a switching circuit 460. According to some example embodiments, the display device 400 may further include a scan driving circuit and a light emission driving circuit.

Each of the first data driving circuit 440 and the second data driving circuit 450 may be configured as an independent integrated circuit (IC). The first data driving circuit 440, the second data driving circuit 450, and the switching circuit 460 may be arranged on a non-display region NDA of a display substrate 402 using a chip-on-plastic (COP) method.

The driving controller 420 and the voltage generator 430 may be mounted on a main substrate 404. A flexible circuit board 470 electrically connects the main substrate 404 and the display substrate 402.

Figure 11:
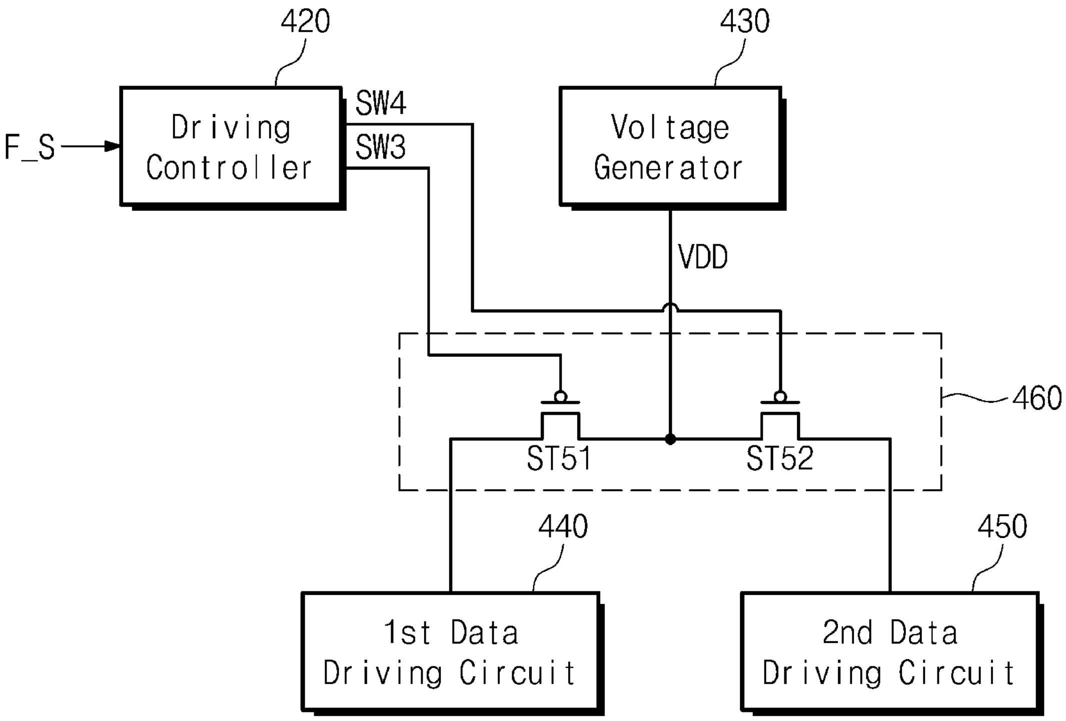
FIG. 11 is a diagram illustrating an example connection relationship between partial circuits illustrated in FIG. 10.

FIG. 11 is a diagram illustrating an example connection relationship between partial circuits illustrated in FIG. 10.

Referring to FIG. 11, the driving controller 420 receives the folding detection signal F_S, and outputs the third switching signal SW3 and the fourth switching signal SW4. For example, when the folding detection signal F_S has an active level (e.g., a high level), the driving controller 420 deactivates at least one of the third switching signal SW3 or the fourth switching signal SW4.

The voltage generator 430 generates a driving voltage VDD. The driving voltage VDD may be a power supply voltage of the first data driving circuit 440 and the second data driving circuit 450, but is not limited thereto. For example, the driving voltage VDD may be an analog reference voltage required for generating a gradation voltage of each of the first data driving circuit 440 and the second data driving circuit 450.

The switching circuit 460 may selectively provide the driving voltage VDD to the first data driving circuit 440 and the second data driving circuit 450 in response to the third switching signal SW3 and the fourth switching signal SW4.

The switching circuit 460 includes a switching transistor ST51 and a switching transistor ST52. The switching transistor ST51 includes a first electrode for receiving the driving voltage VDD, a second electrode connected to the first data driving circuit 440, and a gate electrode for receiving the third switching signal SW3. The switching transistor ST52 includes a first electrode for receiving the driving voltage VDD, a second electrode connected to the second data driving circuit 450, and a gate electrode for receiving the fourth switching signal SW4.

Figure 12:
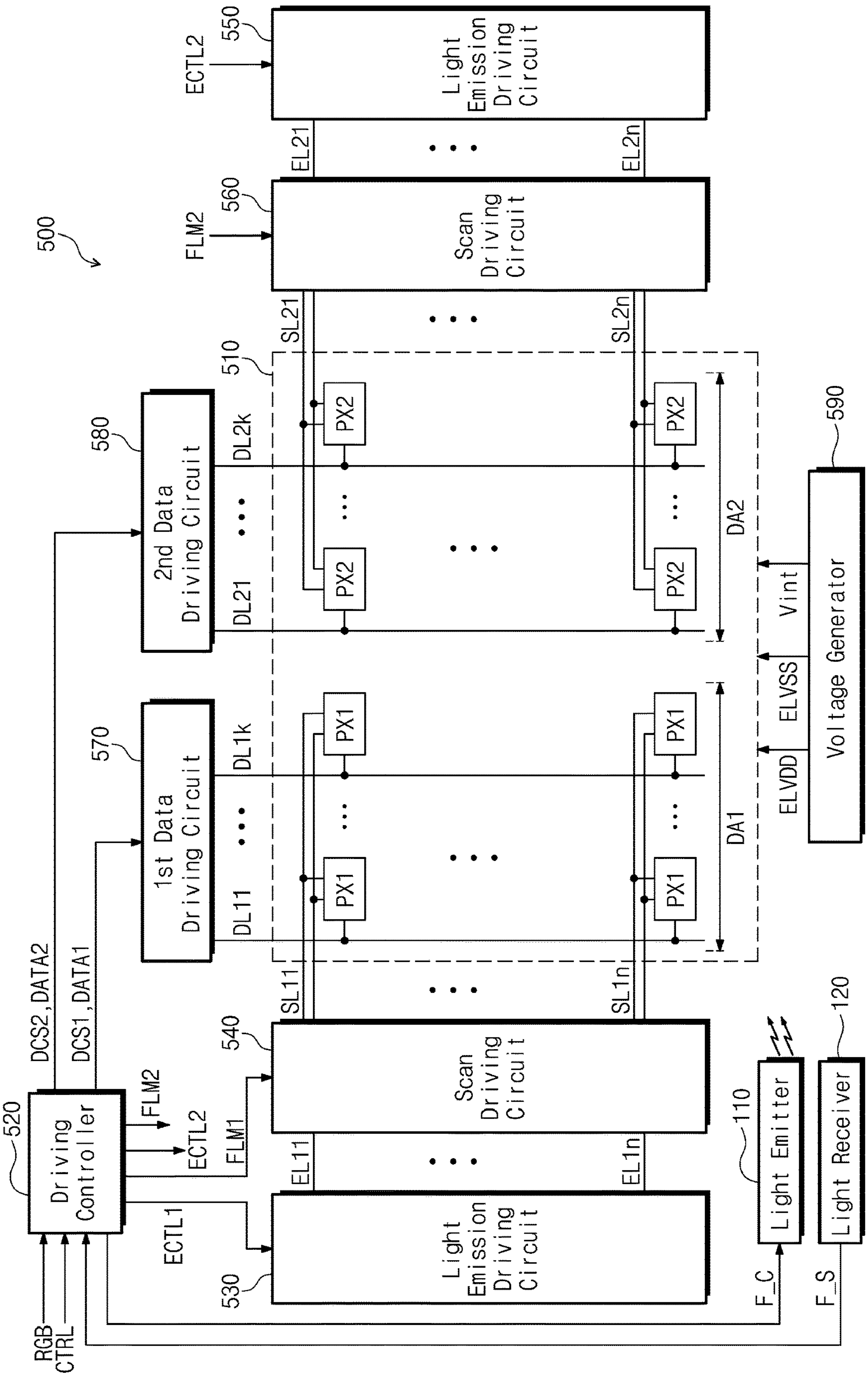
FIG. 12 is a diagram illustrating a circuit configuration of a display device according to some example embodiments of the inventive concept.

FIG. 12 is a diagram illustrating a circuit configuration of a display device according to some example embodiments of the inventive concept.

Referring to FIG. 12, a display device 500 includes the light emitter 110, the light receiver 120, a pixel circuit 510, a driving controller 520, a first light emission driving circuit 530, a first scan driving circuit 540, a second light emission driving circuit 550, a second scan driving circuit 560, a first data driving circuit 570, a second data driving circuit 580, and a voltage generator 590.

The driving controller 520 receives the image signal RGB and the control signal CTRL, and converts a data format of the image signal RGB so that the image signal RGB is suitable for the pixel circuit 510, so as to generate the first image data signal DATA1 and the second image data signal DATA2. The driving controller 520 outputs a first start control signal FLM1, a second start control signal FLM2, a first light emission start signal ECTL1, a second light emission start signal ECTL2, the first data control signal DCS1, the second data control signal DCS2, and the folding detection control signal F_C.

The first light emission driving circuit 530 receives the first light emission start signal ECTL1 from the driving controller 520. The first light emission driving circuit 530 generates a plurality of light emission control signals in response to the first light emission start signal ECTL1, and outputs the light emission control signals to a plurality of first light emission control lines EL11 to EL1*n*.

The first scan driving circuit 540 receives the first start control signal FLM1 from the driving controller 520. The first scan driving circuit 540 generates a plurality of scan signals, and outputs the plurality of scan signals to first scan lines SL11 to SL1*n*.

The second light emission driving circuit 550 receives the second light emission start signal ECTL2 from the driving controller 520. The second light emission driving circuit 550 generates a plurality of light emission control signals in response to the second light emission start signal ECTL2, and outputs the light emission control signals to a plurality of second light emission control lines EL21 to EL2*n*.

The second scan driving circuit 560 receives the second start control signal FLM2 from the driving controller 520. The second scan driving circuit 560 generates a plurality of scan signals, and outputs the plurality of scan signals to second scan lines SL21 to SL2*n*.

The first data driving circuit 570 receives the first data control signal DCS1 and the first image data signal DATA1 from the driving controller 520. The first data driving circuit 570 converts the first image data signal DATA1 into first data signals, and outputs the first data signals to a plurality of first data lines DL11 to DL1*k*. The first data signals are analog voltages corresponding to gradation values of the first image data signal DATA1.

The second data driving circuit 580 receives the second data control signal DCS2 and the second image data signal DATA2 from the driving controller 520. The second data driving circuit 580 converts the second image data signal DATA2 into second data signals, and outputs the second data signals to a plurality of second data lines DL21 to DL2*k*. The second data signals are analog voltages corresponding to gradation values of the second image data signal DATA2.

The voltage generator 590 generates voltages required for operating the display device 500. In this embodiment, the voltage generator 590 generates the first driving voltage ELVDD, the second driving voltage ELVSS, and the initialization voltage Vint, but embodiments of the inventive concept are not limited thereto. For example, the voltage generator 590 may further generate an analog reference voltage required for generating gradation voltages of the first data driving circuit 570 and the second data driving circuit 580. The second driving voltage ELVSS may have a lower level than that of the first driving voltage ELVDD.

The pixel circuit 510 includes a plurality of first pixels PX1 and a plurality of second pixels PX2. Each of the plurality of first pixels PX1 is connected to a corresponding first data line among the plurality of first data lines DL11 to DL1*k*, and is connected to a corresponding first scan line among the plurality of first scan lines SL11 to SL1*n*. Each of the plurality of second pixels PX2 is connected to a corresponding second data line among the plurality of the second data lines DL21 to DL2*k*, and is connected to a corresponding second scan line among the plurality of second scan lines SL21 to SL2*n*.

Each of the plurality of first pixels PX1 and the plurality of second pixels PX2 receives the first driving voltage ELVDD, the second driving voltage ELVSS, and the initialization voltage Vint.

Each of the first pixels PX1 and the second pixels PX2 may have the circuit configuration illustrated in FIG. 5. The first pixels PX1 may be arranged in the first display region DA1 illustrated in FIG. 1, and the second pixels PX2 may be arranged in the second display region DA2.

Although it is illustrated and described that the first pixels PX1 are connected to the first data driving circuit 570 via the first data lines DL11 to DL1*k*, and the second pixels PX2 are connected to the second data driving circuit 580 via the second data lines DL21 to DL2*k*, embodiments of the inventive concept are not limited thereto. For example, the first data lines DL11 to DL1*k* and the second data lines DL21 to DL2*k* may be driven by a single data driving circuit.

The driving controller 520 outputs the folding detection control signal F_C to the light emitter 110. For example, the driving controller 520 may periodically activate the folding detection control signal F_C during operation.

The light emitter 110 outputs the light ray signal in response to the folding detection control signal F_C. The light ray signal may be an infrared signal, but is not limited thereto. The light receiver 120 receives the light ray signal from the light emitter 110.

As illustrated in FIG. 3B, the light ray signal output from the light emitter 110 when the display device 100 is out-folded may be received by the light receiver 120. The light receiver 120 outputs the folding detection signal F_S at an active level (e.g., a high level) when the light quantity of the received light ray signal has at least a predetermined level. This folding detection signal F_S is provided to the driving controller 520.

The driving controller 520 regards the display device 500 as being out-folded when the folding detection signal F_S has an active level (e.g., a high level), and deactivates the first switching signal SW1 or the second switching signal SW2. For example, the driving controller 520 may deactivate the first switching signal SW1 when the folding detection signal F_S has an active level. When the first switching signal SW1 is deactivated, the first pixels PX1 may be turned off since the first driving voltage ELVDD is not provided to the first pixels PX1.

According to some example embodiments of the inventive concept, the display device 500 may further include a gyroscope sensor. The driving controller 520 may determine which one of the first display region DA1 and the second display region DA2 is an invisible region on the basis of a detection signal from the gyroscope sensor when the folding detection signal F_S transitions to an active level. The driving controller 520 deactivates the first switching signal SW1 when the first display region DA1 is determined to be an invisible region, and deactivates the second switching signal SW2 when the second display region DA2 is determined to be an invisible region.

According to some example embodiments of the inventive concept, the driving controller 520 may regard a preset one among the first display region DA1 and the second display region DA2 as an invisible region when the folding detection signal F_S has an active level.

The light emitter 110 outputs the light ray signal in response to the folding detection control signal F_C. The light ray signal may be an infrared signal, but is not limited thereto. The light receiver 120 receives the light ray signal from the light emitter 110.

As illustrated in FIG. 3B, the light ray signal output from the light emitter 110 when the display device 500 is out-folded may be received by the light receiver 120. The light receiver 120 outputs the folding detection signal F_S at an active level (e.g., a high level) when the light quantity of the received light ray signal has at least a predetermined level. This folding detection signal F_S is provided to the driving controller 520.

Figure 13:
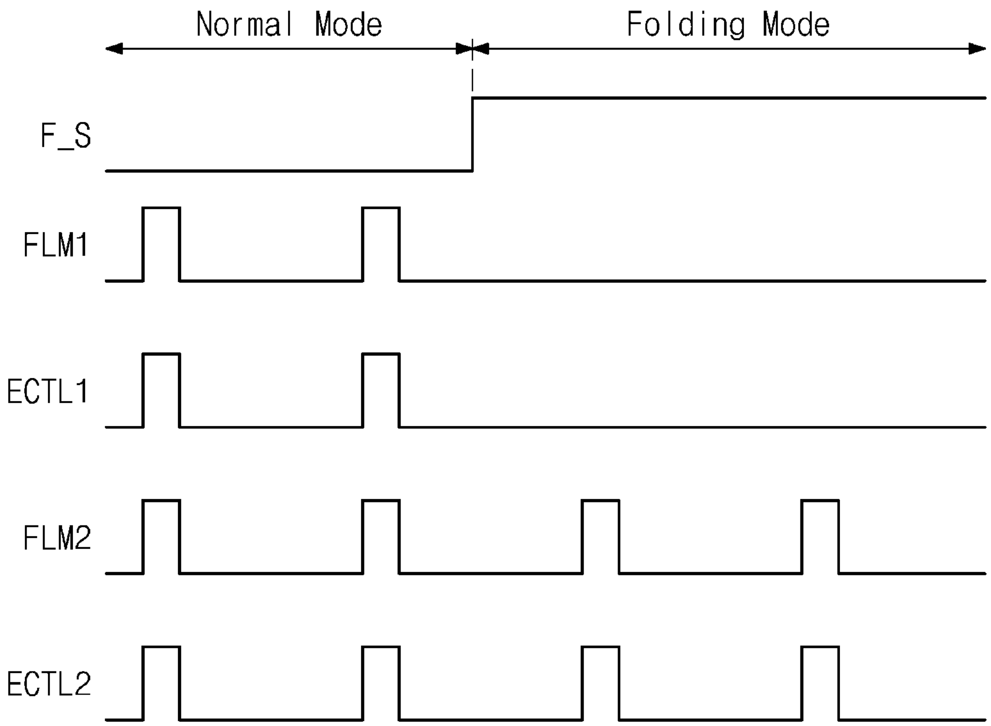
FIG. 13 is a timing diagram illustrating operation of the display device illustrated in FIG. 12.

FIG. 13 is a timing diagram illustrating operation of the display device illustrated in FIG. 12.

Referring to FIGS. 12 and 13, the driving controller 520 provides the first start control signal FLM1, the first light emission start signal ECTL1, the second start control signal FLM2, and the second light emission start signal ECTL2 of a normal mode to the first scan driving circuit 540, the first light emission driving circuit 530, the second scan driving circuit 560, and the second light emission driving circuit 550 respectively while the folding detection signal F_S has an inactive level (e.g., a low level).

The driving controller 520 regards the display device 500 as being out-folded when the folding detection signal F_S has an active level (e.g., a high level), and maintains the first start control signal FLM1 provided to the first scan driving circuit 540 at an inactive level (e.g., a low level). The first pixels PX1 may be turned off because the first scan signals are not provided to the plurality of first scan lines SL11 to SL1*n* while the first start control signal FLM1 is maintained at an inactive level.

Furthermore, when the folding detection signal F_S has an active level (e.g., a high level), the driving controller 520 maintains the first light emission start signal ECTL1 provided to the first light emission driving circuit 530 at an inactive level (e.g., a low level). The first pixels PX1 may be turned off since the first light emission control signals are not provided to the plurality of first light emission control lines EL11 to EL1*n* while the first light emission start signal ECTL1 is maintained at an inactive level.

As described above, power consumption of the display device 500 may be reduced by turning off an invisible region when the display device 500 is out-folded.

Figure 14:
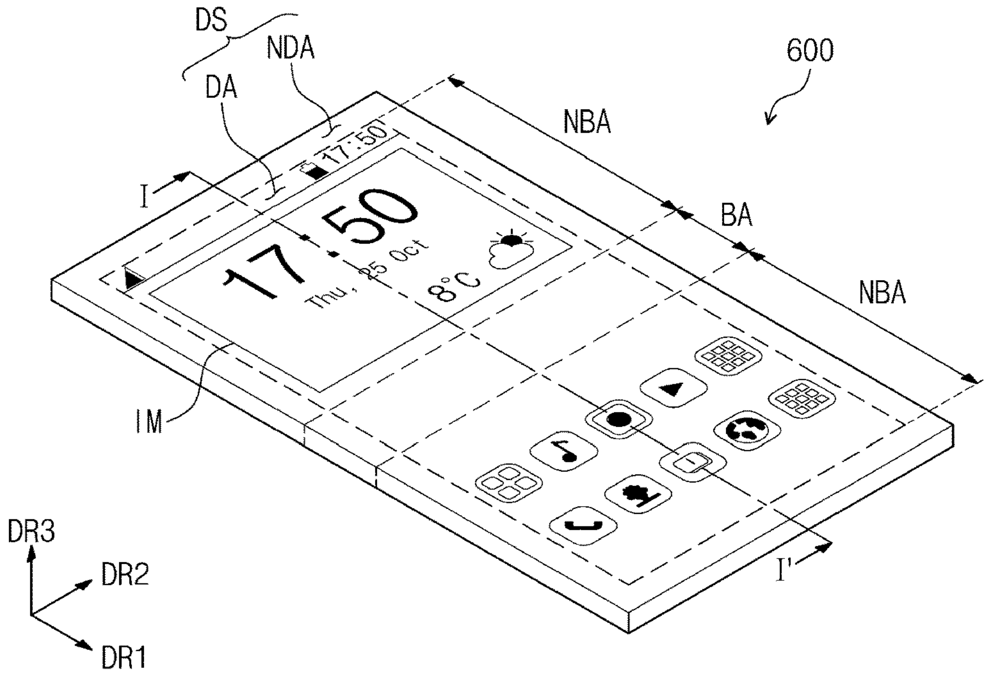
FIG. 14 is a perspective view of a display device according to some example embodiments of the inventive concept.
Figure 15:
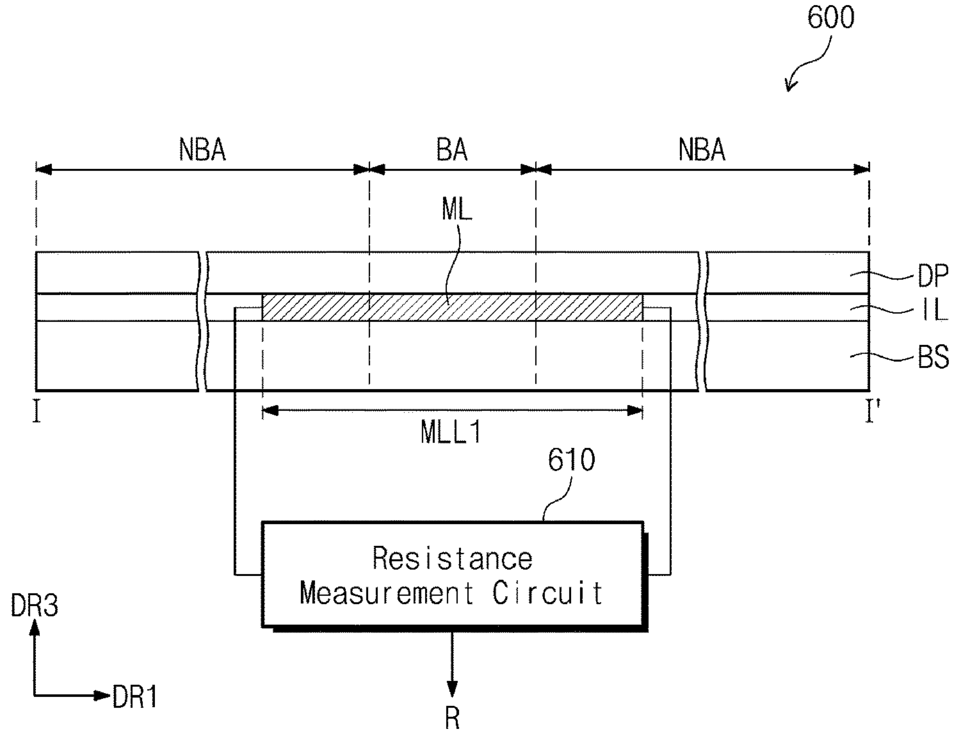
FIG. 15 is a schematic cross-sectional view of the display device taken along the line I-I' of FIG. 14.
Figure 16:
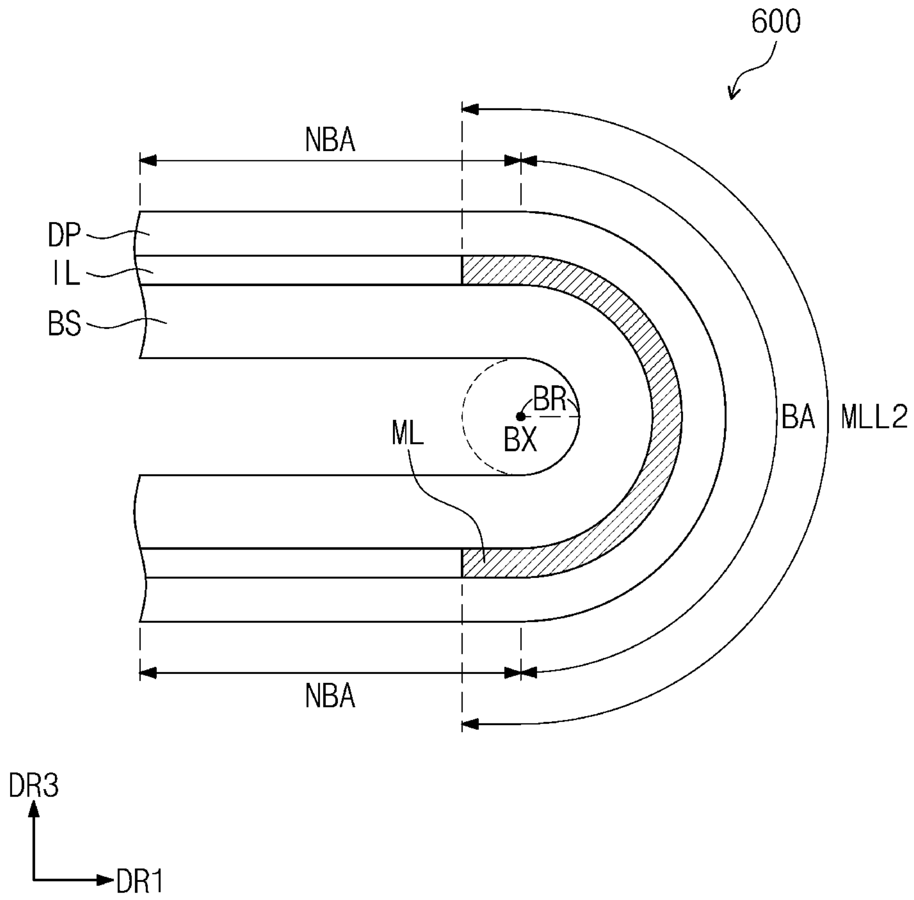
FIG. 16 is a perspective view illustrating a folded state of the display device of FIG. 14.

FIG. 14 is a perspective view of a display device according to some example embodiments of the inventive concept. FIG. 15 is a schematic cross-sectional view of the display device taken along line I-I' of FIG. 14. FIG. 16 is a perspective view illustrating a folded state of the display device of FIG. 14.

Referring to FIG. 14, a display device 600 according to some example embodiments of the inventive concept is a foldable display device. However, the flexible display device 600 according to embodiments is not limited to the illustrated shape, and thus the flexible display device 600 according to some example embodiments may include a display device having a part that is bent by tensile force or compressive force.

The flexible display device 600 may include a plurality of regions defined according to operation types. The flexible display device 600 according to some example embodiments may include the display panel including a bending region BA that is bent about a bending axis BX and a non-bending region NBA. The flexible display device 600 according to some example embodiments may include at least one bending region BA and at least one non-bending region NBA. Although FIG. 14 illustrates one bending region BA and two non-bending regions NBA, embodiments of the inventive concept are not limited thereto. For example, the flexible display device 600 according to some example embodiments may include a plurality of bending regions BA. Furthermore, the flexible display device 600 according to some example embodiments may include three or more non-bending regions NBA.

In the flexible display device 600 according to some example embodiments, the bending region BA and the non-bending region NBA may be connected to each other. For example, the non-bending regions NBA may be arranged on both sides of the bending region BA according to some example embodiments as illustrated in FIG. 14.

As illustrated in FIG. 14, a display surface DS of the flexible display device 600 may include a plurality of regions. The flexible display device 600 includes a display region DA in which an image IM is displayed and a non-display region NDA adjacent to the display region DA. The non-display region NDA is one in which the image IM is not displayed.

Referring to FIG. 15, the display device 600 includes a base substrate BS, an insulating layer IL, a conductive layer ML, and a display substrate DP. The base substrate BS may include a plastic protection film. A material of the base substrate BS is not limited to plastic resins, and may include organic/inorganic composite materials. The base substrate BS may include a porous organic layer and an inorganic material filling pores of the organic material. The base substrate BS may further include a functional layer formed on a plastic film. According to some example embodiments of the inventive concept, the base substrate BS may not be provided.

The display substrate DP generates an image IM (see FIG. 14) corresponding to input image data. The display substrate DP may further include a touch detection unit. FIG. 15 illustrates an organic light emitting display substrate as a representative example of the display substrate DP. However, embodiments of the inventive concept are not limited thereto, and thus the display substrate DP may be a liquid crystal display substrate, a plasma display substrate, or an electrophoretic display substrate. According to some example embodiments, the display substrate DP may include a base layer, a pixel circuit layer located on the base layer, a light emitting element layer, and a thin-film encapsulation layer.

The insulating layer IL is located between the base substrate BS and the display substrate DP. The conductive layer ML is located between the base substrate BS and the display substrate DP. The insulating layer IL and the conductive layer ML may be positioned in the same layer. According to some example embodiments of the inventive concept, the insulating layer IL may cover an entire area of the conductive layer ML.

The conductive layer ML may include metals such as molybdenum, silver, titanium, copper, aluminum, or an alloy thereof. The conductive layer ML overlaps the bending region BA in a plan view. For example, a length MLL1 of the conductive layer ML in the first direction DR1 may be longer than the bending region BA. That is, the conductive layer ML may partially overlap the bending region BA in a plan view.

The display device 600 includes a resistance measurement circuit 610. The resistance measurement circuit 610 is electrically connected to two end portions of the conductive layer ML, measures a resistance value of the conductive layer ML, and outputs a measured resistance value R.

Referring to FIG. 16, the display device 600 may be out-folded with respect to the bending axis BX. A radius of curvature BR of the bending region BA may be about 5 mm or less. For example, the radius of curvature BR may indicate a radius of curvature formed by an inner surface of the bending region BA in a bent or folded state. In detail, in the flexible display device 600 of an embodiment, the radius of curvature BR may be from about 1 mm to about 5 mm.

A length MLL2 of the conductive layer ML in a state in which the display device 600 is out-folded may be larger than the length MLL1 of the conductive layer ML in the first direction in a state in which the display device 600 is unfolded. Conductivity, i.e., resistance, of the conductive layer ML may vary since the conductive layer ML is stretched when the display device 600 is out-folded.

The display device 600 may detect a resistance change of the conductive layer ML when the length of the conductive layer ML changes from MLL1 to MLL2, and may determine whether the display device 600 is out-folded according to the detected resistance value R.

Furthermore, the display device 600 may include the circuit elements illustrated in FIGS. 4 to 12. Power consumption of the display device 600 may be reduced by turning off an invisible region when the display device 600 is out-folded.

Figure 17A:
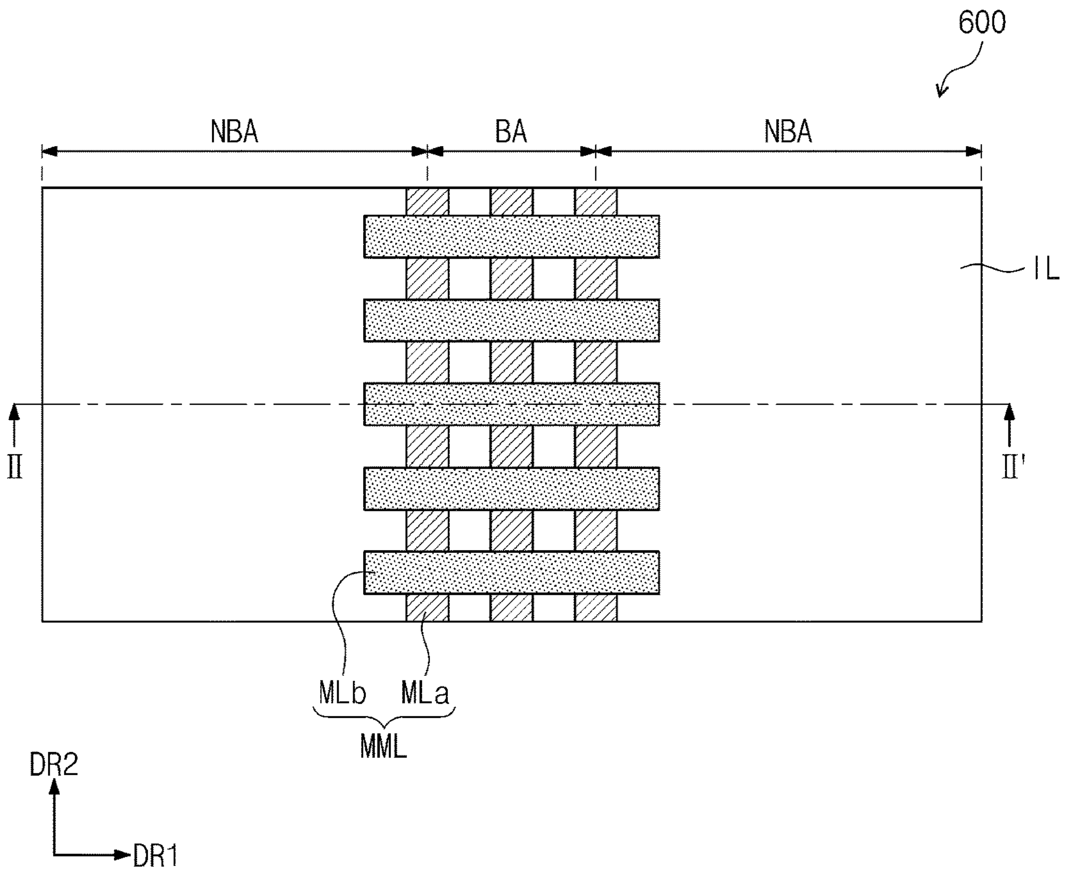
FIG. 17A is a planar view illustrating a conductive layer and an insulating layer according to some example embodiments of the inventive concept of the display device illustrated in FIG. 14.
Figure 17B:
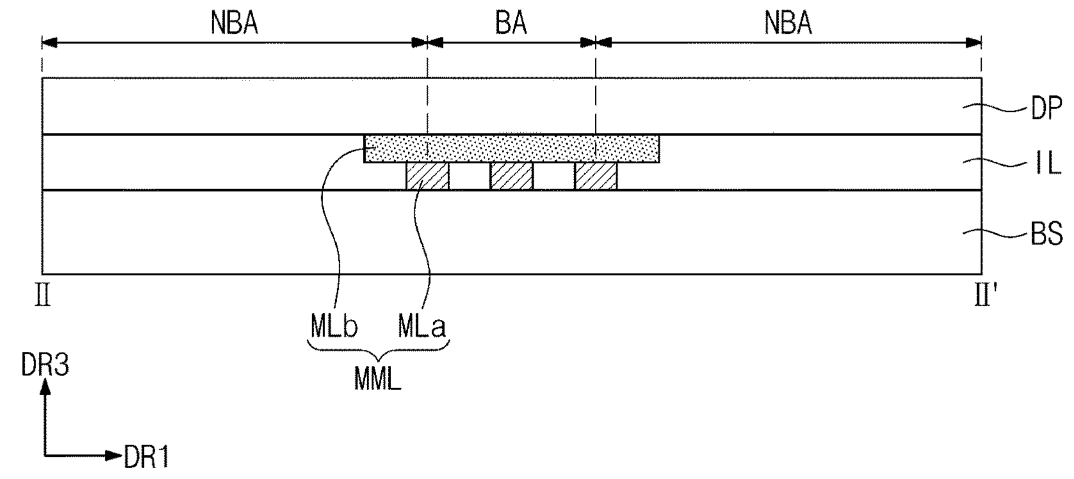
FIG. 17B is a schematic cross-sectional view of the conductive layer and the insulating layer taken along the line II-II' of FIG. 17A.

FIG. 17A is a planar view illustrating a conductive layer and an insulating layer according to some example embodiments of the display device illustrated in FIG. 14. FIG. 17B is a schematic cross-sectional view of the conductive layer and the insulating layer taken along line II-II' of FIG. 17A.

Referring to FIGS. 17A and 17B, the insulating layer IL is located between the base substrate BS and the display substrate DP. A conductive layer MML is located between the base substrate BS and the display substrate DP. The insulating layer IL and the conductive layer MML may be positioned in the same layer. According to some example embodiments of the inventive concept, the insulating layer IL may cover an entire area of the conductive layer MML.

The conductive layer MML may include metals such as molybdenum, silver, titanium, copper, aluminum, or an alloy thereof. The conductive layer MML includes a first conductive layer MLa and a second conductive layer MLb. The first conductive layer MLa and the second conductive layer MLb may be formed of the same material or different materials.

The first conductive layer MLa and the second conductive layer MLb may be arranged on the insulating layer IL in a lattice form. The first conductive layer MLa and the second conductive layer MLb arranged in a lattice form may be easily stretched when the display device 600 is out-folded.

The display device 600 may detect a resistance change of the conductive layer MML, and may determine whether the display device 600 is out-folded according to the detected resistance value R.

A display device configured as described above may reduce power consumption by turning off operation of an invisible region when the display device is folded.

Although aspects of some example embodiments of the present invention have been described, it is understood that the present invention should not be limited to these example embodiments but various changes and modifications can be made by one ordinary skilled in the art within the spirit and scope of the present invention as defined by the following claims and their equivalents.

What is claimed is:

1. A display device comprising:
- a display panel comprising:
  - a first display region including first pixels connected to a plurality of first data lines and a plurality of scan lines; and
  - a second display region including second pixels connected to a plurality of second data lines and the plurality of scan lines;
- a voltage generator configured to generate a first driving voltage;
- a driving controller configured to output a first switching signal and a second switching signal; and
- a switching circuit configured to provide the first driving voltage to the first pixels in response to the first switching signal and to provide the first driving voltage to the second pixels in response to the second switching signal,
- wherein the driving controller is configured to determine whether or not each of the first display region and the second display region is an active region or an inactive region, and to output the first switching signal and the second switching signal corresponding to a determination result,
- wherein at least one of the first pixels comprises:
- a first light emitting diode comprising an anode and a cathode;
- a first transistor comprising a first electrode electrically connected to a first voltage line, a second electrode electrically connected to the anode of the first light emitting diode, and a gate electrode;
- a second transistor comprising a first electrode connected to a corresponding first data line among the plurality of first data lines, and a second electrode connected to the first electrode of the first transistor and a gate electrode receiving a first scan signal; and
- a third transistor comprising a first electrode connected to the second electrode of the first transistor, a second electrode connected to the gate electrode of the first transistor, and a gate electrode receiving the first scan signal.

2. The display device of claim 1, wherein the driving controller is configured to generate the first switching signal and the second switching signal so as to provide the first driving voltage to the first pixels and to not provide the first driving voltage to the second pixels when the first display region is the active region and the second display region is the inactive region.

3. The display device of claim 1, further comprising:
- a light emitter configured to output a light ray signal; and
- a light receiver configured to activate a light detection signal when the light ray signal is received,
- wherein the driving controller is configured to deactivate either the first switching signal or the second switching signal when the light detection signal is activated.

4. The display device of claim 1, wherein the switching circuit comprises:
- a first switching transistor configured to transfer the first driving voltage to the first voltage line in response to the first switching signal; and
- a second switching transistor configured to transfer the first driving voltage to a second voltage line in response to the second switching signal.

5. The display device of claim 4, wherein at least one of the second pixels comprises:
- a second light emitting diode comprising an anode and a cathode;
- a first transistor comprising a first electrode electrically connected to the first voltage line, a second electrode electrically connected to the anode of the second light emitting diode, and a gate electrode;
- a second transistor comprising a first electrode connected to a corresponding second data line among the plurality of second data lines, and a second electrode connected to the first electrode of the first transistor and a gate electrode receiving the first scan signal; and a third transistor comprising a first electrode connected to the second electrode of the first transistor, a second electrode connected to the gate electrode of the first transistor, and a gate electrode connected to the first scan signal.

6. The display device of claim 1, further comprising:

a first data driving circuit configured to drive the plurality of first data lines;

a second data driving circuit configured to drive the second data lines; and a scan driving circuit configured to drive the plurality of scan lines.

7. The display device of claim 6, wherein the driving controller is further configured to output a third switching signal and a fourth switching signal, and the display device further comprises a data driving control circuit configured to selectively provide a second driving voltage to the first data driving circuit in response to the third switching signal and to selectively provide the second driving voltage to the second data driving circuit in response to the fourth switching signal.

8. The display device of claim 7, wherein the data driving control circuit is on a same circuit board as at least one of the driving controller and the voltage generator.

9. The display device of claim 7, wherein the data driving control circuit is on a same circuit board as at least one of the first data driving circuit and the second data driving circuit.

10. The display device of claim 7, wherein the data driving control circuit comprises:

a third switching transistor configured to transfer the second driving voltage to the first data driving circuit in response to the third switching signal; and a fourth switching transistor configured to transfer the second driving voltage to the second data driving circuit in response to the fourth switching signal.

11. The display device of claim 5, wherein the display panel comprises a bending region and a non-bending region, and comprises:

a base layer;

a pixel layer disposed on the base layer;

a conductive layer disposed in the bending region between the base layer and the pixel layer, wherein the display device further comprises a resistance measurement circuit configured to measure a resistance of the conductive layer, wherein the pixel layer comprises the first transistor, the second transistor and the third transistor of at least one of the first pixels and the first transistor, the second transistor and the third transistor of at least one of the second pixels, and wherein the light emitting layer comprises the first light emitting diode and the second light emitting diode.

12. The display device of claim 11, wherein the display panel is configured to be bent about a bending axis, and the driving controller is configured to output at least one of the first switching signal and the second switching signal at an inactive level in response to the resistance indicating that the display panel is bent.

13. A display device comprising:

a display panel comprising a first display region including first pixels connected to a plurality of first data lines and a plurality of first scan lines and a second display region including second pixels connected to a plurality of second data lines and a plurality of second scan lines;

a driving controller configured to output a first start control signal and a second start control signal;

a first scan driving circuit configured to drive the plurality of first scan lines in response to the first start control signal; and a second scan driving circuit configured to drive the plurality of second scan lines in response to the second start control signal, wherein the driving controller is configured to determine whether or not each of the first display region and the second display region is an active region or an inactive region, and to output the first start control signal and the second start control signal corresponding to a determination result, wherein at least one of the first pixels comprises:

a light emitting diode comprising an anode and a cathode;

a first transistor comprising a first electrode electrically connected to a first voltage line, a second electrode electrically connected to the anode of the light emitting diode, and a gate electrode;

a second transistor comprising a first electrode connected to a corresponding first data line among the plurality of first data lines, and a second electrode connected to the first electrode of the first transistor and a gate electrode receiving a first scan signal; and a third transistor comprising a first electrode connected to the second electrode of the first transistor, a second electrode connected to the gate electrode of the first transistor, and a gate electrode receiving the first scan signal.

14. The display device of claim 13, wherein the driving controller is configured to provide the first start control signal to the first scan driving circuit and to maintain the second start control signal at an inactive level when the first display region is the active region and the second display region is the inactive region.

15. The display device of claim 13, further comprising:

a light emitter configured to output a light ray signal; and a light receiver configured to activate a light detection signal when the light ray signal is received, wherein the driving controller is configured to maintain at least one of the first start control signal and the second start control signal at an inactive level when the light detection signal is activated.

16. The display device of claim 13, further comprising:

a first light emission driving circuit configured to provide a first light emission control signal to the first pixels in synchronization with a first light emission start signal; and a second light emission driving circuit configured to provide a second light emission control signal to the second pixels in synchronization with a second light emission start signal, wherein the driving controller is further configured to output the first light emission start signal and the second light emission start signal.

17. The display device of claim 16, wherein the driving controller is further configured to provide the first light emission start signal to the first light emission driving circuit and to maintain the second light emission start signal at an inactive level when the first display region is the active region and the second display region is the inactive region.

18. The display device of claim 13, wherein the display panel comprises a bending region and a non-bending region, and comprises:

a base layer;

a pixel circuit layer disposed on the base layer;

a light emitting element layer disposed on the pixel layer; and a conductive layer disposed in the bending region between the base layer and the pixel circuit layer, wherein the display device further comprises a resistance measurement circuit configured to measure a resistance of the conductive layer, wherein the pixel layer comprises the first transistor, the second transistor and the third transistor of at least one of the first pixels, and wherein the light emitting element layer comprises the light emitting diode.

19. The display device of claim 18, wherein the display panel is configured to be bent about a bending axis, and the driving controller is configured to output at least one of the first start control signal and second start control signal at an inactive level when the resistance indicates that the display panel is bent.

* * * * *